(12) United States Patent
Kitazato et al.

(10) Patent No.: US 11,057,683 B2
(45) Date of Patent: Jul. 6, 2021

(54) RECEIVING DEVICE, RECEIVING METHOD, TRANSMITTING DEVICE, AND TRANSMITTING METHOD

(71) Applicant: Saturn Licensing LLC, New York, NY (US)

(72) Inventors: Naohisa Kitazato, Tokyo (JP); Yasuaki Yamagishi, Kanagawa (JP); Yoshiharu Dewa, Tokyo (JP); Jun Kitahara, Shizuoka (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/327,873

(22) PCT Filed: Aug. 24, 2015

(86) PCT No.: PCT/JP2015/073655
§ 371 (c)(1),
(2) Date: Jan. 20, 2017

(87) PCT Pub. No.: WO2016/035589
PCT Pub. Date: Mar. 10, 2016

(65) Prior Publication Data
US 2017/0214977 A1 Jul. 27, 2017

(30) Foreign Application Priority Data
Sep. 5, 2014 (JP) .............................. JP2014-181625

(51) Int. Cl.
*H04N 21/488* (2011.01)
*H04N 21/235* (2011.01)
(Continued)

(52) U.S. Cl.
CPC ....... *H04N 21/4884* (2013.01); *H04N 21/235* (2013.01); *H04N 21/435* (2013.01); *H04N 21/64322* (2013.01); *H04N 21/8133* (2013.01)

(58) Field of Classification Search
None
See application file for complete search history.

(56) References Cited

U.S. PATENT DOCUMENTS

2002/0075403 A1* 6/2002 Barone, Jr. ........ H04N 5/44513
348/461
2008/0284910 A1* 11/2008 Erskine ................... G11B 27/11
348/468

(Continued)

FOREIGN PATENT DOCUMENTS

JP 2001-136444 A 5/2001
JP 2013-172181 A 9/2013
(Continued)

OTHER PUBLICATIONS

International Search Report dated Nov. 17, 2015 in PCT/JP15/073655 Filed Aug. 24, 2015.
(Continued)

*Primary Examiner* — Justin E Shepard
(74) *Attorney, Agent, or Firm* — Oblon, McClelland, Maier & Neustadt, L.L.P.

(57) ABSTRACT

The present technology relates to a receiving device, a receiving method, a transmitting device, and a transmitting method that enable operation of subtitles to be displayed in a superimposed manner on broadcast content reliably.
The receiving device acquires trigger information for providing a function relating to subtitles, the trigger information including location information by which a resource on the Internet is identifiable; acquires subtitle information including a document relating to subtitles described in a predetermined computer language, on the basis of the location
(Continued)

information included in the trigger information; and controls displaying of the subtitles on the basis of at least one of the trigger information and the subtitle information. The present technology is applicable to a television receiver capable of receiving digital broadcast signals, for example.

17 Claims, 29 Drawing Sheets

(51) Int. Cl.
*H04N 21/435* (2011.01)
*H04N 21/643* (2011.01)
*H04N 21/81* (2011.01)

(56) References Cited

U.S. PATENT DOCUMENTS

2010/0174608 A1* 7/2010 Harkness ............ G06F 21/10
                                                      705/14.53
2012/0054816 A1 3/2012 Dewa
2013/0076981 A1* 3/2013 Labrozzi ............. H04N 5/04
                                                      348/500
2014/0071342 A1* 3/2014 Winograd ........... H04N 5/44
                                                      348/383
2015/0113558 A1 4/2015 Ozawa et al.

FOREIGN PATENT DOCUMENTS

WO      2012/029565 A1    3/2012
WO      2013/136715 A1    9/2013
WO   WO 2014/126422 A1    8/2014

OTHER PUBLICATIONS

Extended European Search Report issued in European Patent Application No. 15837345.6 dated Mar. 19, 2018.

Office Action dated Apr. 9, 2019 in corresponding Japanese Patent Application No. 2016-546426 (with English Translation), 11 pages.

* cited by examiner

FIG. 1

Subtitle Trigger format

- Trigger URI format
  Trigger = locator_part [ "?" terms ]
- locator_part: Subtitle URL
- terms = (append | media_time |event ) [ "&" spread ]
  [ "&" version] [ "&" others]

FIG. 2

```
<append>
 — a=<region>.<subtitle> [&t= <event_time>] [&s= <style>]
 — region : corresponds to region attribute of the target TTML doc.
           It indicates the subtitle description area of the screen.
 — subtitle : subtitle text
 — event_time : <begin_time> . <end_time>
 — style : corresponds to style attribute
```

FIG. 5

| Element/Attribute | | Cardinality | Format | Description |
|---|---|---|---|---|
| SIT | | | | |
| | subtitle_tag | 1 | integer | |
| | Subtitle_format | 1 | string | "ttml" etc |
| | Language | 1 | string | "jpn", "us" etc |
| | OperationMode | 1 | string | "pre_produced", "live", "hybrid" |
| | TimeMode | 1 | string | "utc", "trigger", "reference" |
| | ReferenceTime | 0..1 | dateTime | |

RECEIVING DEVICE, RECEIVING METHOD, TRANSMITTING DEVICE, AND TRANSMITTING METHOD

TECHNICAL FIELD

The present technology relates to a receiving device, a receiving method, a transmitting device, and a transmitting method. In particular, the present technology relates to a receiving device, a receiving method, a transmitting device, and a transmitting method which enable operation of subtitles to be displayed in a superimposed manner on broadcast content reliably.

BACKGROUND ART

Operation to re-distribute broadcast content, such as a program broadcasted via terrestrial broadcasting, via cable television (CATV) or satellite broadcasting has been carried out (for example, see Patent Document 1).

CITATION LIST

Patent Document

Patent Document 1: Japanese Patent Application Laid-Open No. 2001-136444

SUMMARY OF THE INVENTION

Problems to be Solved by the Invention

Meanwhile, when broadcast content such as a program broadcasted via terrestrial broadcasting is re-distributed via cable television, there is a case where a system provided in the terrestrial broadcasting such as control of subtitles displayed in a superimposed manner on the broadcast content cannot be maintained in re-distribution via cable television or the like. In that case, as a receiver is unable to display subtitles in a superimposed manner on the broadcast content such as a program, a technology for reliably operating the subtitles has been requested.

The present technology has been made in consideration of such a situation. The present technology enables operation of subtitles to be displayed in a superimposed manner on broadcast content reliably.

Solutions to Problems

A receiving device of a first aspect of the present technology includes: a first acquiring unit that acquires trigger information for providing a function relating to a subtitle, the trigger information including location information by which a resource on the Internet is identifiable; a second acquiring unit that acquires subtitle information including a document relating to a subtitle described in a predetermined computer language, on the basis of the location information included in the trigger information; and a subtitle controller that controls displaying of the subtitle on the basis of at least one of the trigger information and the subtitle information.

The receiving device of the first aspect of the present technology may be an independent device or an internal block constituting a device. Further, the receiving method of the first aspect of the present technology is a receiving method corresponding to the receiving device of the first aspect of the present technology.

In the receiving device and the receiving method of the first aspect of the present technology, the trigger information for providing a function relating to subtitles is acquired. The trigger information includes location information by which a resource on the Internet is identifiable. On the basis of the location information included in the trigger information, subtitle information including a document relating to subtitles described in a predetermined computer language is acquired. Displaying of the subtitles is controlled on the basis of at least one of the trigger information and the subtitle information.

A transmitting device of a second aspect of the present technology includes: a generating unit that generates trigger information for providing a function relating to a subtitle, the trigger information including location information for acquiring subtitle information including a document relating to a subtitle described in a predetermined computer language, and a transmitting unit that transmits the generated trigger information.

The transmitting device of the second aspect of the present technology may be an independent device or an internal block constituting a device. Further, the transmitting method of the second aspect of the present technology is a transmitting method corresponding to the transmitting device of the second aspect of the present technology.

In the transmitting device and the transmitting method of the second aspect of the present technology, trigger information for providing a function relating to subtitles is generated. The trigger information includes location information for acquiring subtitle information including a document relating to subtitles described in a predetermined computer language. The generated trigger information is transmitted.

Effects of the Invention

According to the first aspect and the second aspect of the present technology, it is possible to reliably perform operation of subtitles to be displayed in a superimposed manner on broadcast content.

It should be noted that the effects described herein are not limited. Any effects described in the present disclosure are acceptable.

BRIEF DESCRIPTION OF DRAWINGS

FIG. 1 illustrates a configuration of subtitle trigger information.

FIG. 2 illustrates a method of describing append information.

FIG. 5 illustrates examples of SIT syntaxes.

MODE FOR CARRYING OUT THE INVENTION

Figure 3:
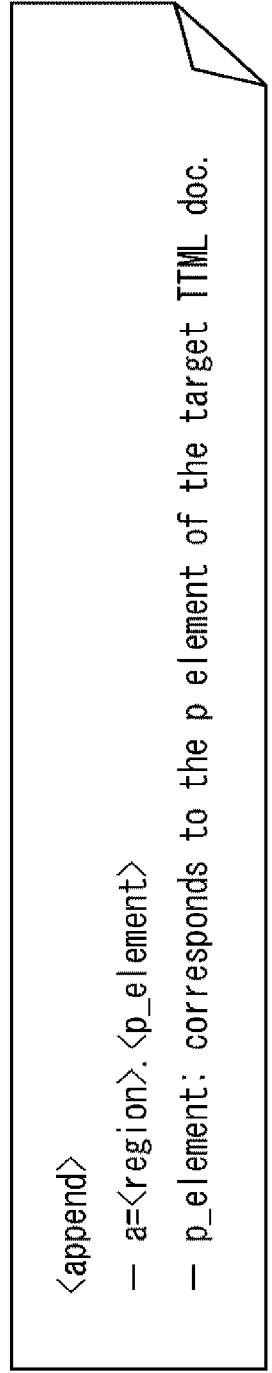
FIG. 3 illustrates another method of describing append information.

Hereinafter, embodiments of the present technology will be described with reference to the drawings. It should be noted that the description will be given in the following sequence.
1. Outline of subtitle control
2. Outline of digital broadcasting by IP transmission system
3. Specific use cases
(1) Use case 1: Control of subtitles displayed in superimposed manner on recorded program
(2) Use case 2: Control of subtitles displayed in superimposed manner on live program
(3) Use case 3: Control of subtitles of hybrid-type
(4) Use case 4: Control of subtitles displayed in superimposed manner on recorded program (ACR compliant)
(5) Use case 5: Control of subtitles displayed in superimposed manner on live program (ACR compliant)
(6) Use case 6: Control of subtitles of hybrid-type (ACR compliant)
4. System configuration
5. Flow of processes executed by respective devices
6. Computer configuration
<1. Outline of Subtitle Control>

Subtitle control applied with the present technology uses trigger information and subtitle information to control subtitles displayed in a superimposed manner on broadcast content. Trigger information serves as information for providing various types of functions. In the case where a particular command ID (cmdID) is designated, it also functions as trigger information providing a function relating to subtitles (hereinafter also referred to as "subtitle trigger information").

Meanwhile, subtitle information is configured of a TTML document described in Timed Text Markup Language (TTML), and subtitle information table (SIT) information describing information relating to subtitles. It should be noted that TTML is a markup language standardized by World Wide Web Consortium (W3C), capable of designating text display timing and display position, the details of which will be described below. Further, SIT information is hint information relating to subtitles.
(Configuration of Subtitle Trigger Information)

FIG. 1 illustrates a configuration of subtitle trigger information.

Trigger information has a structure describing a command ID (cmdID) as type information showing the type of the trigger information, a trigger channel ID for identifying a trigger channel through which the trigger information is transmitted, and Uniform Resource Identifier (URI) that is the body of the trigger information.

For example, in the subtitle trigger information, "4" is designated as a command ID. Further, the trigger channel ID is an ID that identifies a trigger channel showing the system of each function provided by the trigger information. That is, there is a case where a plurality of units of trigger information of the same type may be transmitted through a plurality of trigger channels. In the case of subtitle trigger information, subtitle trigger information for controlling English subtitles (English) and subtitle trigger information for controlling Spanish subtitles (Spanish) can be transmitted through different channels, for example.

In the subtitle trigger information of FIG. 1, location information (locator_part) corresponds to URI, and terms (terms) can be designated optionally. As location information, Uniform Resource Locator (URL) of acquisition destination of subtitle information is designated.

Further, as terms, append information (append), media time information (media_time), or event information is designated. In append information, information for adding information relating to displaying of a subtitle (additional information), with respect to the TTML document constituting the subtitle information, is designated.

As illustrated in FIG. 2, for example, as append information, region information (region), subtitle information (subtitle), event time information (event_time), and style information (style) can be designated. In region information, information corresponding to the region attribute described in the TTML document is described. In subtitle information, text information of a subtitle is described. In event time information, display begin time and display end time of a subtitle are described. In style information, information relating to the style of a subtitle is described.

It should be noted that as illustrated in FIG. 3, the content of a p element in the TTML document may be directly described as append information. In that case, the content of the p element is inserted at a predetermined position in the TTML document as it is.

In media time information (media_time), information showing the time (time information), serving as the reference for performing subtitle display control, is designated. In event information, information for operating the information relating to displaying of a subtitle, described in the TTML document constituting the subtitle information, is designated.

Figure 4:
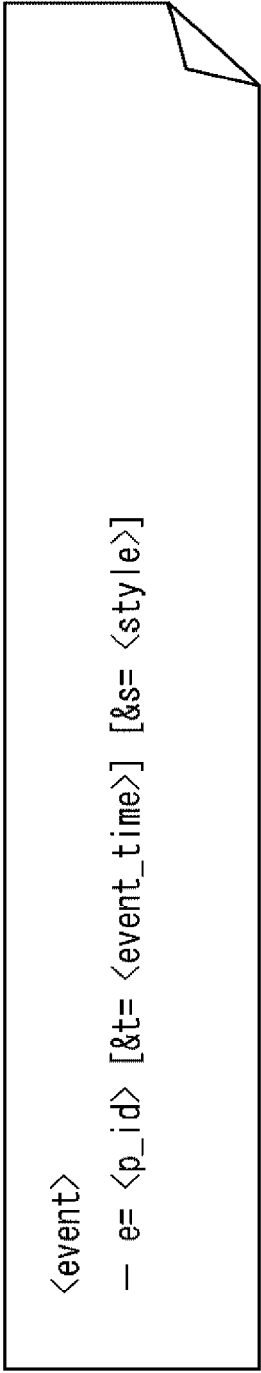
FIG. 4 illustrates a method of describing event information.

For example, as illustrated in FIG. 4, id of a p element can be described in event information. In that case, among the p elements described in the TTML document, a p element of a particular id can be operated. It should be noted that in the event information, event time information (event_time) for changing the display time of a p element having a particular id and style information (style) for changing the style can be described.

It should be noted that in the subtitle trigger information of FIG. 1, as terms, a parameter of spread information (spread), version information (version), or others can be designated optionally. In spread information, information for stochastically decentralizing operation relating to subtitles is designated. In version information, various types of version information are designated. It should be noted that these parameters are linked using "&".

(SIT Configuration)

FIG. 5 illustrates exemplary SIT syntaxes. SIT is described in a markup language such as Extensible Markup Language (XML). Further, regarding the number of appearances (Cardinality) in FIG. 5, when "1" is designated, only one element or attribute thereof is designated necessarily, and when "0 . . . 1" is designated, it is optional to designate an element or an attribute thereof.

SIT elements as route elements are configured of a subtitle_tag element, a Subtitle_format element, a Language element, an OperationMode element, a TimeMode element, and a ReferenceTime element.

In subtitle_tag element, a subtitle tag showing a channel for each object (e.g., for visually handicapped person, or the like) is designated. In Subtitle_format element, a format of subtitles is designated. For example, in the case of using a TTML document, "ttml" is designated.

In Language element, a language is designated. For example, "jpn" is designated for Japan, and "us" is designated for the United States. In OperationMode element, an operation mode is designated. For example, "pre_produced" is designated for a recorded program, "live" is designated for a live program, and "hybrid" is designated for a hybrid-type program, respectively.

In TimeMode element, a time mode is designated. For example, "utc" is designated when an absolute time is used, "trigger" is designated when the media time information included in the trigger information is used, and "reference" is used when a relative time is used, respectively. It should be noted that when "reference" is designated as TimeMode element, it is shown using a relative time in which the begin time or the like of the program designated in ReferenceTime element is used as the starting point of time.

(Configuration of TTML Document)

Figure 6:
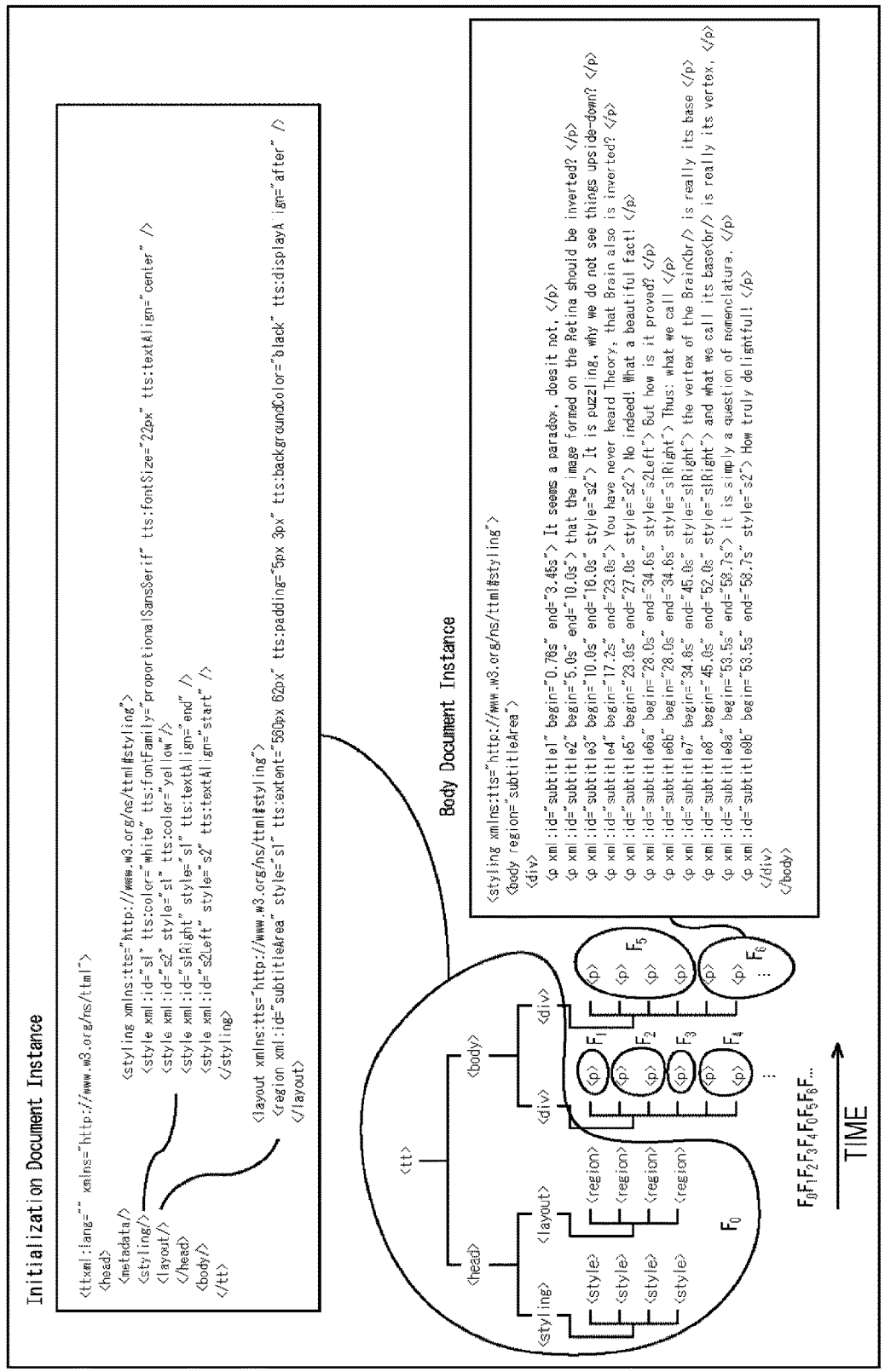
FIG. 6 illustrates a configuration of a TTML document.

FIG. 6 illustrates a configuration of a TTML document.

As illustrated in FIG. 6, in the initialization document instance, rendering contexts such as color, font, and display position of the characters displayed as subtitles are designated by elements such as a styling element or a layout element.

In this example, a rendering context s1 is defined by the description "<region xml:id="subtitleArea" style= "s1" . . . >" in the layout element. For example, it is possible to define a plurality of types of rendering contexts such as s1, and s2 in one initialization document instance. Further, in the body document instance, an element such as p element is described. For example, by the description "<p xml:id= . . . >" of p element, a character string of the subtitles and attributes such as display begin time and display end time are designated.

As described above, a TTML document is described to have a hierarchical structure formed of a combination of an initialization document instance and a body document instance. A hierarchical structure configured of a combination of such instances is illustrated in the lower left part of FIG. 6.

For example, in a receiver that receives a stream of broadcast content and displays it, by allowing the receiver to receive the TTML document illustrated in FIG. 6 and analyzing it, it is possible to display given text information (character string) at a given time slot in the broadcast content.

Figure 7:
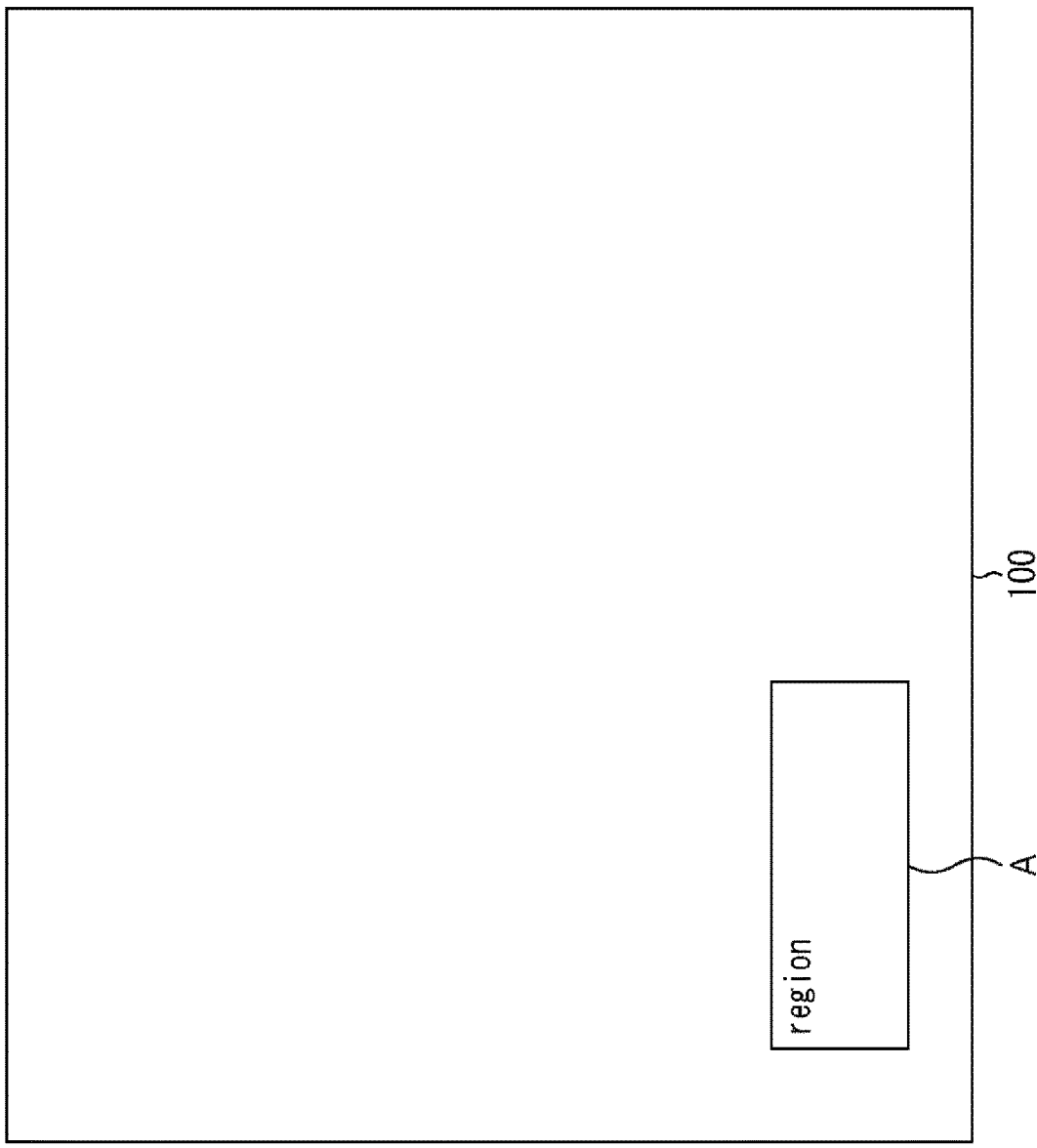
FIG. 7 illustrates an example of displaying a TTML document.

This means that as illustrated in FIG. 7, on a display 100 of a receiver, display of subtitles in a region A designated by the region attribute is changed as appropriate, on the basis of the character string designated by the p element in the body document instance and the attribute indicating the display begin time and display end time. In the example of FIG. 6, a character string F1, a character string F2, and the like, designated by the p elements in the body document instance, are displayed by being switched over time.

It should be noted that the details of the TTML are disclosed in ""Timed Text Markup Language (TTML) 1.0" W3C Recommendation 18 Nov. 2010", and the like.

<2. Outline of Digital Broadcasting by IP Transmission System>

Meanwhile, as the digital broadcast standard in respective countries, Moving Picture Experts Group phase 2-Transport Stream (MPEG2-TS) system is adopted as a transmission system, and it is supposed to provide higher-level services by introducing an IP transmission system using internet protocol (IP) packets, having been used in the field of communications, for digital broadcasting in the future. Particularly, in Advanced Television Systems Committee (ATSC) 3.0 that is the next-generation broadcasting standard of the United States, formulation of which is now under way, it is expected to adopt digital broadcasting using an IP transmission system.

(System Pipe Model)

Figure 8:
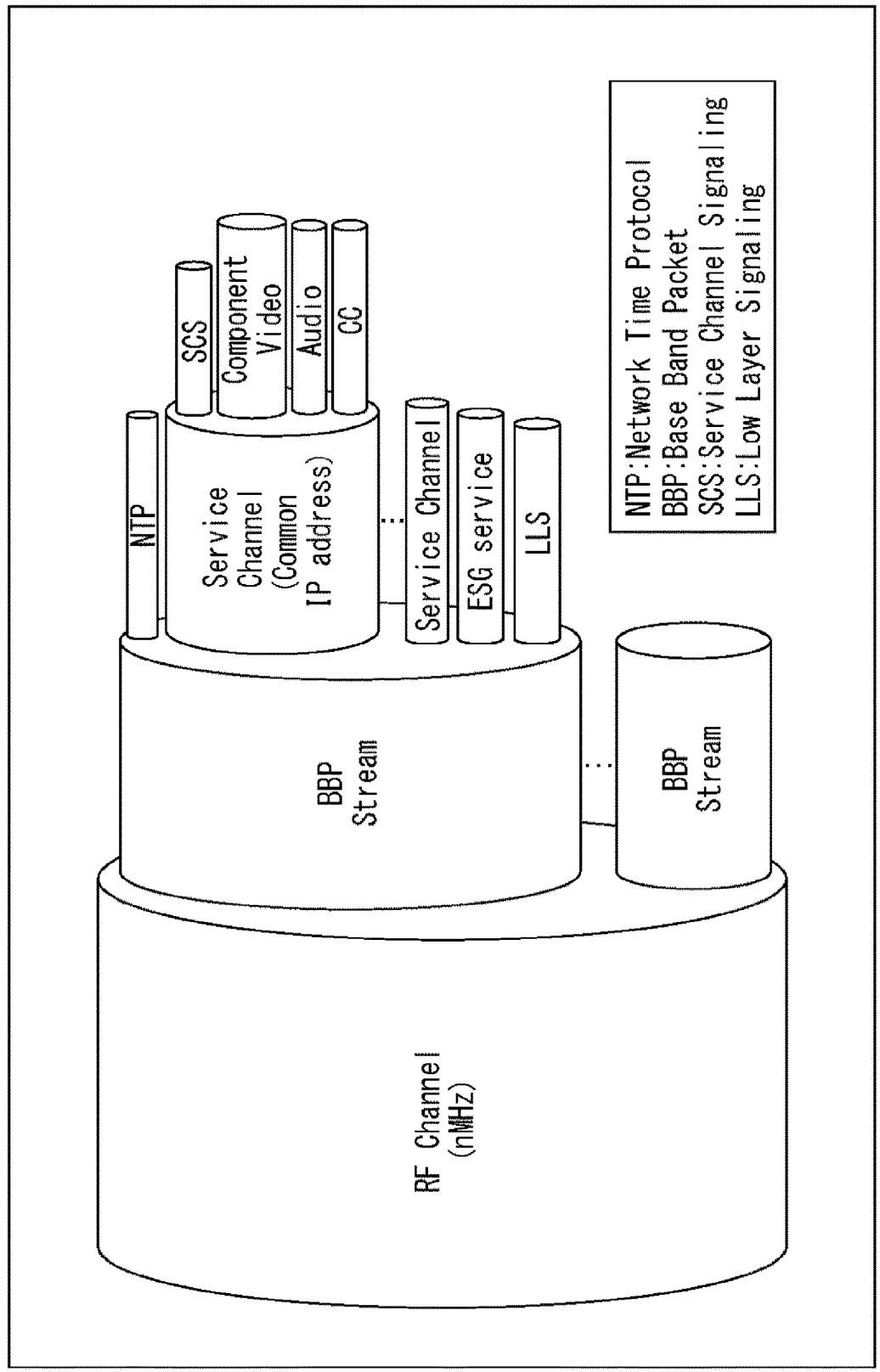
FIG. 8 illustrates a system pipe model of digital broadcasting of an IP transmission system.

FIG. 8 illustrates a system pipe model of digital broadcasting of an IP transmission system.

In FIG. 8, a plurality of Base Band Packet (BBP) streams is transmitted in a broadcast wave (RF Channel) having a given frequency band. Further, each BBP stream includes Network Time Protocol (NTP), a plurality of service channels (Service Channel), an Electronic Service Guide (ESG) service, and Low Layer Signaling (LLS). It should be noted that while NTP, service channels, and ESG service are transmitted according to the protocol of User Datagram Protocol/Internet Protocol (UDP/IP), LLS is transmitted on the BBP stream.

NTP is time information. ESG service is an electronic service guide (electronic program guide). In LLS, low-layer signaling information is transmitted. For example, as LLS, LLS signaling information such as Service Configuration Description (SCD), Emergency Alerting Description (EAD), and Region Rating Description (RRD) is transmitted.

SCD shows the BBP stream configuration and the service configuration in the broadcasting network, by the ID system supporting the aforementioned MPEG2-TS system. Further, SCD includes attribute and setting information for each service, and bootstrap information for connecting to the ESG service and SCS.

EAD includes information regarding an emergency notice. RRD includes rating information. It should be noted that LLS signaling information such as SCD is described in a markup language such as XML, for example.

The service channels (hereinafter also referred to as "services") are configured of Service Channel Signaling (SCS) and components (Component) constituting a program (broadcast content) such as video, audio, and subtitles. It should be noted that elements constituting each service are provided with a common IP address, and the components and SCS can be packaged for each service by using such an IP address.

In SCS, signaling information of each service is transmitted. For example, as SCS, SCS signaling information such as User Service Description (USD), Media Presentation Description (MPD), Session Description Protocol (SDP), File Delivery Description (FDD), Service Parameter Description (SPD), and Initialization Segment (IS) is transmitted.

USD includes reference information for referring to SCS signaling information such as MPD, FDD, and SDP. It should be noted that USD may be called User Service Bundle Description (USBD). MPD includes information such as segment URL for each stream of component transmitted for each service. It should be noted that MPD conforms to the standard of Moving Picture Expert Group-Dynamic Adaptive Streaming over HTTP (MPEG-DASH). SDP includes a service attribute for each service, configuration information and attributes of a stream, filter information, location information, and the like.

FDD includes information such as location information (e.g., URL or the like) and Transport Object Identifier (TOI) as index information for each Transport Session Identifier (TSI) in a File Delivery over Unidirectional Transport (FLUTE) session. Here, in the FLUTE session, a file to be transmitted and the like is managed by TOI as one object. Further, a set of objects is managed by TSI as one session.

This means that in the FLUTE session, it is possible to designate a particular file by the two types of identification information namely TSI and TOI. It should be noted that FDD may be included in USD as an element. Further, FLUTE+(FLUTE plus), in which FLUTE is expanded, may be used instead of FLUTE.

SPD is configured to include various types of parameters defined at service and component levels. IS includes control information regarding segment data of components of video and audio transmitted in the FLUTE session.

As such, in the case of transmitting components of video and audio in the FLUTE session, a file of such components is divided into segments, and each segment is configured of an initialization segment (IS) and a media segment (MS). IS includes initialization information such as data compression system and control information. Further, MS includes data of components of video and audio. It should be noted that each segment of the FLUTE session conforms to the provisions of ISO Base Media File Format.

It should be noted that SCS signaling information such as USD and MPD is described in a markup language such as XML, for example. Further, in the case where it is not necessary to particularly distinguish LLS signaling information from SCS signaling information in the below description, description will be given by simply referring to "signaling information".

Here, to a broadcast wave (RF Channel) having a given frequency band, an RF channel ID (RF Channel ID) is assigned for each broadcasting organization, for example. Further, to one or more BBP streams transmitted by each broadcast wave, a BBP stream ID (BBP stream ID) is assigned. Furthermore, to one or more services transmitted in each BBP stream, a service ID (service ID) is assigned.

As described above, as an ID system of the IP transmission system, a configuration corresponding to a combination (Triplet) of a network ID (Network ID), a transport stream ID (Transport Stream ID), and a service ID (Service ID) used in MPEG2-TS system is adopted. A BBP stream configuration and a service configuration in the broadcasting network are represented by the triplet.

By using such an ID system, it is possible to conform to MPEG2-TS system which is widespread currently. It should be noted that in the ID system of the IP transmission system, an RF channel ID and a BBP stream ID correspond to the network ID and the transport stream ID in the MPEG2-TS system.

Figure 9:
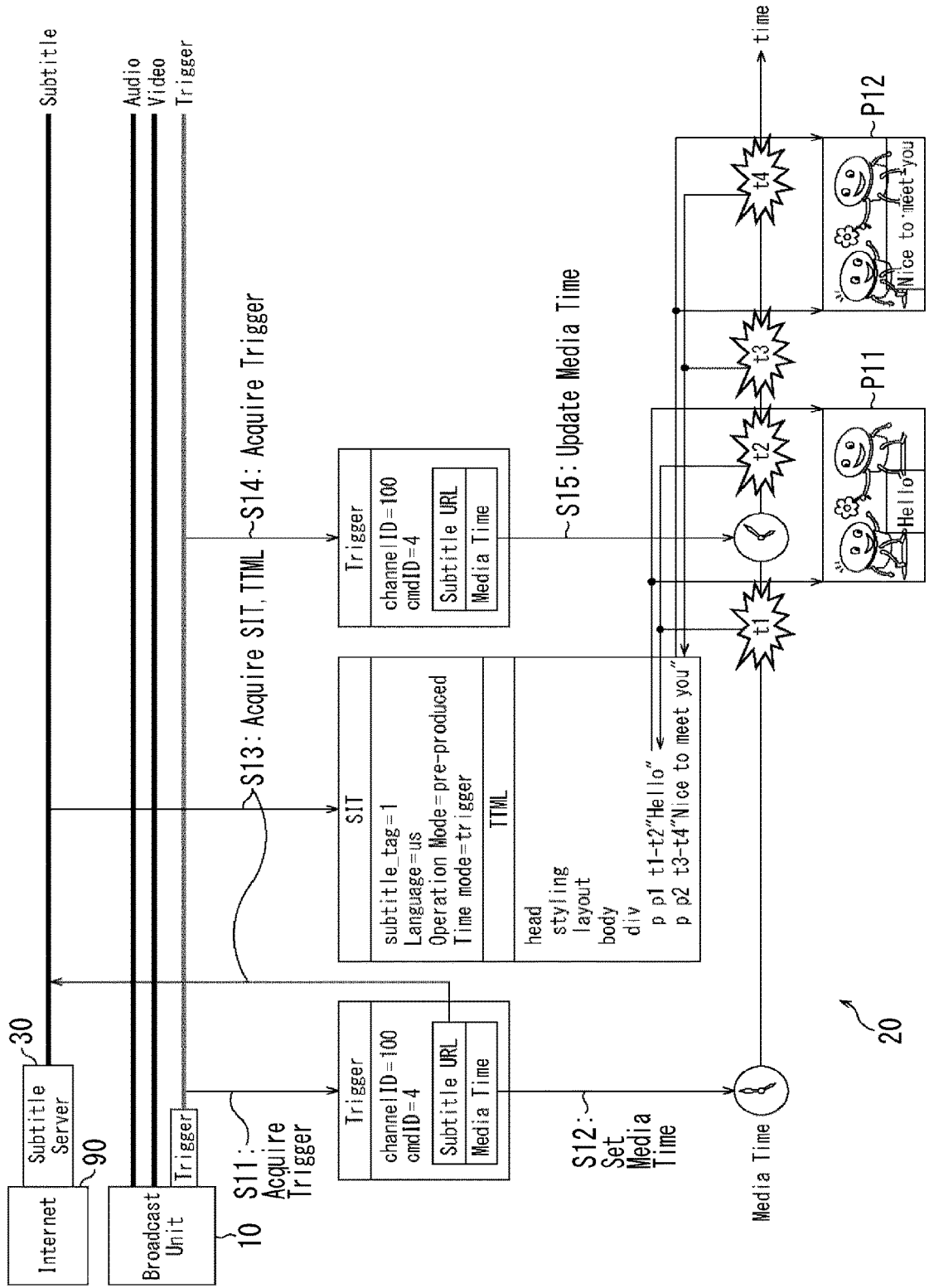
FIG. 9 is a diagram explaining a use case 1.

<3. Specific Use Cases>
(1) Use Case 1: Control of Subtitle Displayed in Superimposed Manner on Recorded Program FIG. 9 is a diagram explaining a use case 1. FIG. 9 illustrates respective processing steps performed by a receiving device 20 installed in each house or the like. A time direction is a direction from the left side toward the right side in the drawing. It should be noted that such a relation is similar in other drawings described below.

In FIG. 9, a transmitting device 10 of a broadcasting station (broadcasting organization), identified by an RF channel ID, transmits a BBP stream identified by a BBP stream ID by digital broadcast signals (Broadcast Signal) using the IP transmission system. In the BBP stream, streams of components (audio/video) constituting broadcast content distributed as a service identified by a service ID and signaling information (not shown) are transmitted. It should be noted that files transmitted in these streams are transmitted in a FLUTE session.

Further, in FIG. 9, a subtitle server 30 is provided on the Internet 90. The subtitle server 30 distributes subtitle information over the Internet 90.

In the use case 1, as broadcast content transmitted from the transmitting device 10, a recorded program such as a drama is delivered. The receiving device 20 connects to audio and video streams of the broadcast content delivered from the transmitting device 10 to thereby play the recorded program.

The receiving device 20 acquires trigger information transmitted in a video stream, at timing that the transmitting device 10 delivers the trigger information (S11 of FIG. 9). The trigger information is subtitle trigger information in which "4" is designated as the command ID. The trigger information includes header information such as a channel ID and a command ID, location information (Subtitle URL), and media time information (Media Time). It should be noted that by designating a channel ID, it is possible to identify subtitle trigger information for controlling English subtitles or Spanish subtitles.

The receiving device 20 sets media time information included in the trigger information and begins clocking of the time according to the media time information (S12 of FIG. 9). Further, the receiving device 20 accesses the subtitle server 30 over the Internet 90 on the basis of the location information included in the trigger information to thereby obtain subtitle information (S13 of FIG. 9).

Here, the subtitle information is configured of SIT information and a TTML document. In the SIT information, "1" is designated as a subtitle tag, "us" indicating the United States is designated as a language, "pre_produced" indicating a recorded program is designated as an operation mode, and "trigger" is designated as a time mode. Further, the TTML document is configured of an initialization document instance and a body document instance, in which the instances are described with the complete content.

In the initialization document instance, rendering contexts, such as the font of the characters displayed as subtitles and the display position, are designated by the styling element and the layout element as child elements of the head element. Further, in the body document instance, a plurality of p elements is listed in div elements of a child element of the body element. In such p elements, character strings of subtitles and attributes, such as display begin time and display end time, are designated.

For example, in a p element having an id "p1", it is designated that a subtitle "Hello" is displayed from a display being time "t1" to a display end time "t2". Further, in a p element having an id "p2", it is designated that a subtitle "Nice to meet you" is displayed from a display begin time "t3" to a display end time "t4".

Further, in the receiving device 20, clocking of the time according to the media time information is started in the processing at step S12, and it is regularly monitored whether the clocking time of the media time is within the display time of the subtitle designated in each p element listed in the body document instance (whether or not the display begin time has passed).

Then, when the clocking time of the media time becomes a time t1, as it is the display begin time of the subtitle designated in the p attribute of the id "p1", the receiving device 20 displays a character string "Hello" designated in the p element of the id "p1" as a subtitle, according to the rendering context designated in the initialization document instance. Thereby, in the receiving device 20, the subtitle "Hello" is superimposed on a video P11 of the recorded program being played. It should be noted that in the receiving device 20, when the clocking time of the media time becomes a time t2, as it is the display end time of the subtitle designated in the p attribute of the id "p1", displaying of the subtitle "Hello" ends.

Further, when the clocking time of the media time becomes a time t3, as it is the display begin time of a subtitle designated in the p attribute of the id "p2", the receiving device 20 displays a character string "Nice to meet you" designated in the p element of the id "p2" as a subtitle, according to the rendering context designated in the initialization document instance. Thereby, in the receiving device 20, the subtitle "Nice to meet you" is superimposed on a video P12 of the recorded program being played. It should be noted that in the receiving device 20, when the clocking time of the media time becomes a time t4, as it is the display end time of the subtitle designated in the p-attribute of the id "p2", displaying of the subtitle "Nice to meet you" ends.

It should be noted that when the receiving device 20 acquires trigger information delivered from the transmitting device 10, the receiving device 20 updates (adjusts) the clocking time of the media time on the basis of the media time information included in the trigger information (S15 and S16 of FIG. 9). In FIG. 9, as the trigger information is acquired between the time t1 and the time t2, the clocking time of the media time is adjusted at that timing.

The use case 1 has been described above. In the use case 1, subtitle information including a TTML document of the complete content is acquired from the subtitle server 30 on the Internet 90 on the basis of location information included in the subtitle trigger information delivered from the transmitting device 10, and according to the clocking time of the media time obtained from the subtitle trigger information, a subtitle designated in the p attribute of the TTML document is displayed in a superimposed manner on a video of the recorded program.

As described above, in the use case 1, as a subtitle is displayed on the basis of the subtitle information acquired via communications in the receiving device 20, even if subtitle information cannot be acquired via broadcasting, it is possible to reliably acquire subtitle information via communications to thereby display a subtitle in a superimposed manner on a video of the recorded program.

(2) Use Case 2: Control of Subtitle Displayed in Superimposed Manner on Live Program FIG. 10 is a diagram explaining a use case 2.

Figure 10:
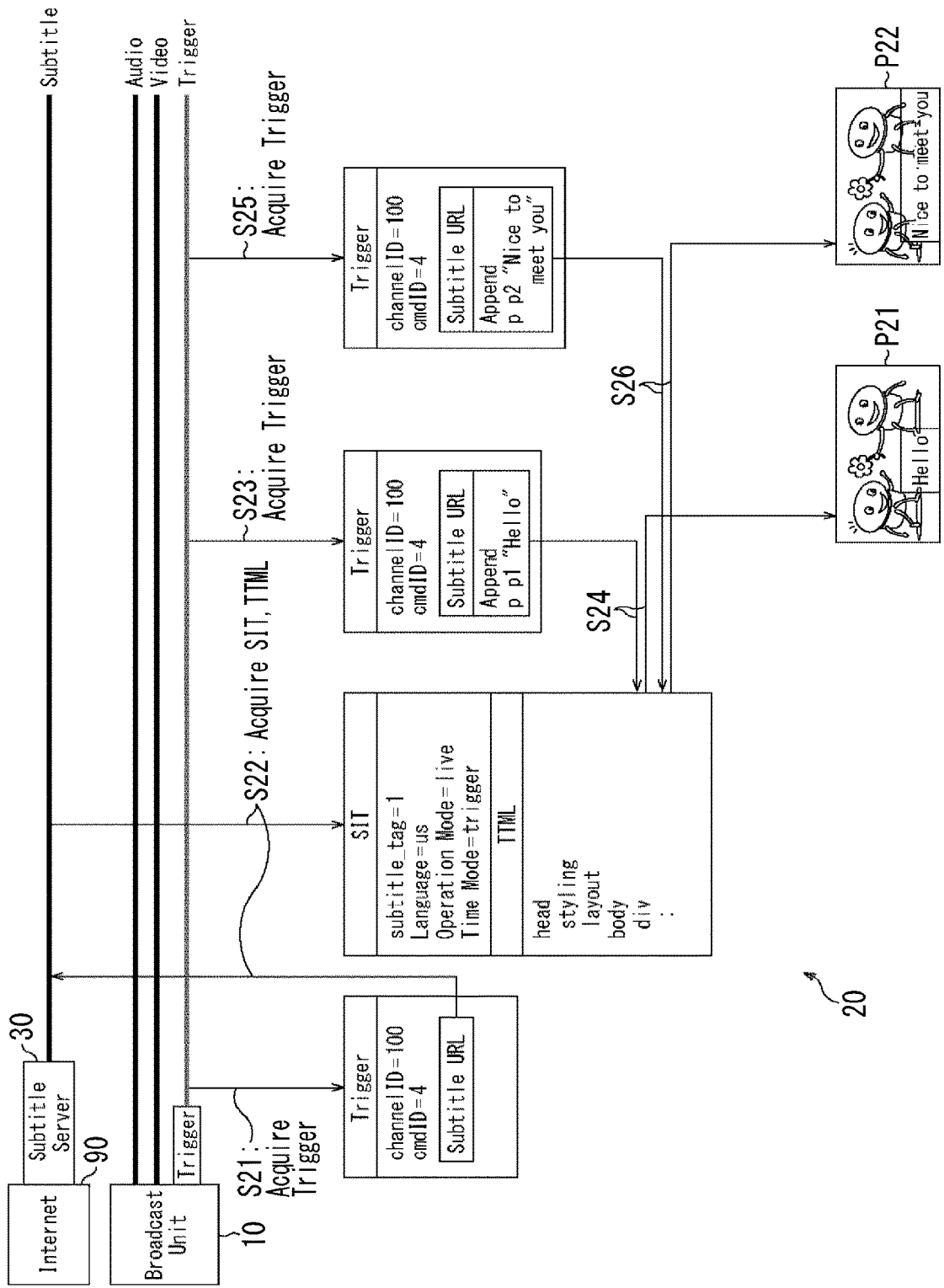
FIG. 10 is a diagram explaining a use case 2.

In FIG. 10, the transmitting device 10 of a broadcasting station (broadcasting organization) identified by an RF channel ID transmits a BBP stream identified by a BBP stream ID, by digital broadcast signals (Broadcast Signal) using the IP transmission system. In the BBP stream, streams of components (audio/video) constituting broadcast content delivered as a service identified by a service ID and signaling information (not shown) are transmitted.

Further, in FIG. 10, the subtitle server 30 is provided on the Internet 90. The subtitle server 30 delivers subtitle information over the Internet 90.

In the use case 2, as broadcast content transmitted from the transmitting device 10, a live program such as sport broadcasting is delivered, for example. The receiving device 20 connects to the streams of audio and video of the broadcast content delivered from the transmitting device 10 to thereby play the live program.

The receiving device 20 acquires trigger information transmitted in the video stream, at the timing of delivering the trigger information by the transmitting device 10 (S21 of FIG. 10). The trigger information is subtitle trigger information in which "4" is designated as a command ID. The trigger information includes location information (subtitle URL) in addition to header information such as a channel ID and a command ID.

The receiving device 20 accesses the subtitle server 30 over the Internet 90 on the basis of the location information included in the trigger information to acquire subtitle information (S22 of FIG. 10).

Here, subtitle information is configured of SIT information and a TTML document, and SIT information includes hint information such as a live program designated as an operation mode, for example. Further, a TTML document is configured of an initialization document instance and a body document instance. A body document instance is not described with a complete content but is described as a so-called template having a content in which a content regarding p elements can be added later.

Then, the receiving device 20 acquires trigger information transmitted in a video stream at the timing that the transmitting device 10 delivers the trigger information (S23 of FIG. 10). The trigger information is subtitle trigger information including append information in addition to location information. In the append information, a character string "Hello" is described as the content regarding a p element of the TTML document. This means that when the content regarding a p element described in the append information is added to the (body document instance of) the TTML document as a template, the content of the TTML document is completed.

With the TTML document having the complete content in which the content regarding the p element of the append information included in the trigger information is added, the receiving device 20 displays a subtitle "Hello" on a video P21 of the live program being played (S24 of FIG. 10).

Thereafter, the receiving device 20 acquires trigger information transmitted in the vide stream, at the timing that the transmitting device 10 delivers the trigger information (S25 of FIG. 10). In the append information included in the trigger information, a character string "Nice to meet you" is described as a content regarding a p element of the TTML document. With the TTML document having the complete content in which the content regarding the p element of the append information included in the trigger information is added, the receiving device 20 displays a subtitle "Nice to meet you" on a video P22 of the live program being played (S26 of FIG. 10).

It should be noted that in FIG. 10, as the display begin time and the display end time of the subtitle are not designated in the append information, a character string included in the append information is displayed as a subtitle immediately at the timing of acquiring the trigger information. However, it is possible to adjust the display timing of the subtitle by designating the display begin time and the display end time of the subtitle. It should be noted that in the case of designating the display begin time and the display end time of the subtitle, it is necessary to clock the time on the basis of the media time information.

The use case 2 has been described above. In the use case 2, a TTML document as a template is acquired from the subtitle server 30 on the Internet 90 on the basis of the location information included in the subtitle trigger information delivered from the transmitting device 10, and then the content of the TTML document is completed by the append information included in the trigger information acquired thereafter. Then, with the TTML document having the complete content, a subtitle is displayed in a superimposed manner on a video of the live program.

As described above, in the use case 2, as a subtitle is displayed on the basis of the subtitle information acquired via communications, even if subtitle information cannot be acquired via broadcasting, it is possible to reliably acquire the subtitle information via communications and to display it in a superimposed manner on a video of the live program in the receiving device 20. Further, in the use case 2, a TTML document as a template is delivered in advance and difference information for completing the content of the TTML document is delivered by the trigger information. Accordingly, it is possible to reduce the load on the subtitle server 30 and the Internet 90 by reducing the amount of information handled at a time.

(3) Use Case 3: Control of Hybrid-Type Subtitle

Figure 11:
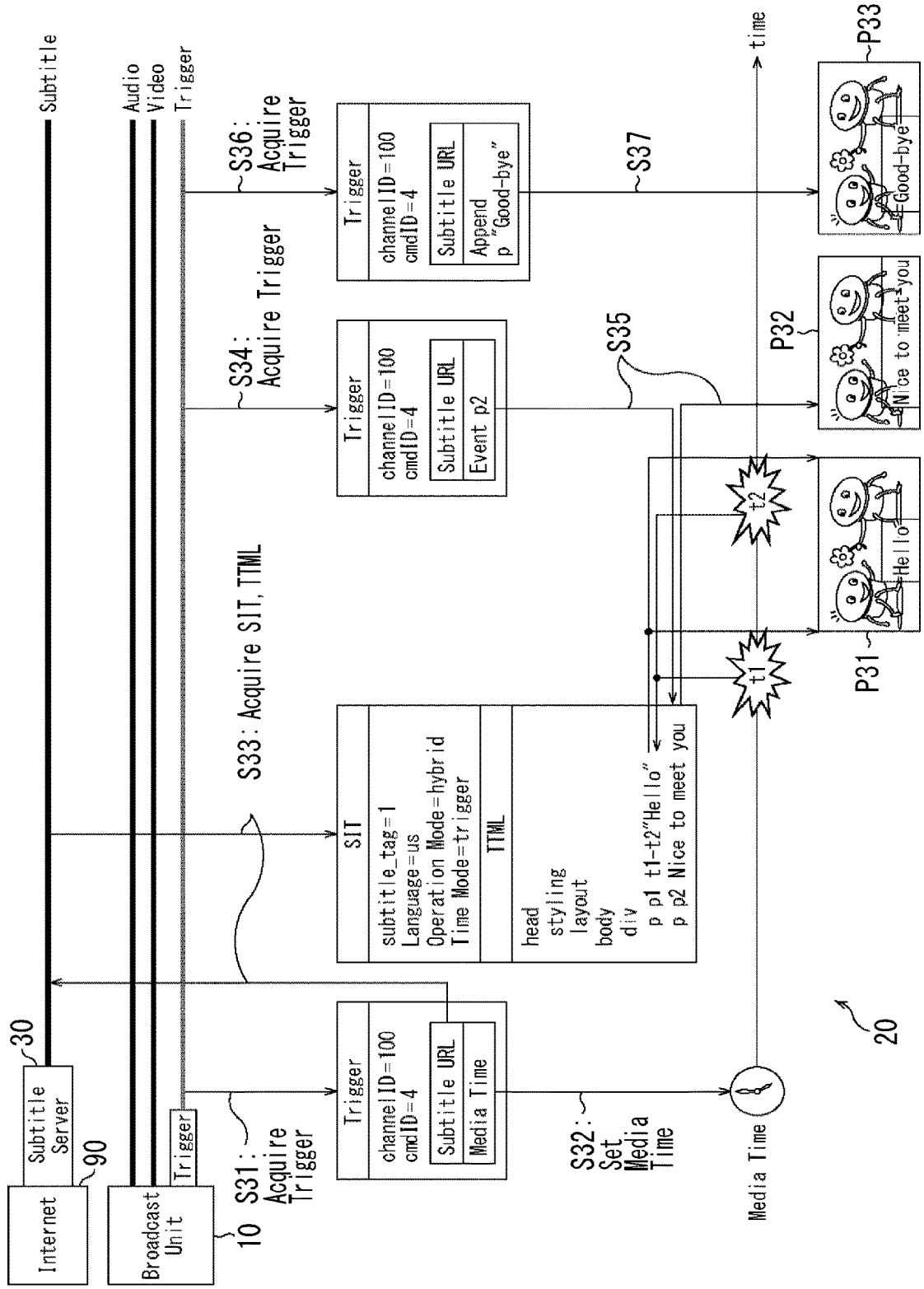
FIG. 11 is a diagram explaining a use case 3.

FIG. 11 is a diagram explaining a use case 3.

In FIG. 11, the transmitting device 10 of a broadcasting station (broadcasting organization) identified by an RF channel ID transmits a BBP stream identified by a BBP stream ID, by digital broadcast signals (Broadcast Signal) using the IP transmission system. In the BBP stream, streams of components (audio/video) constituting broadcast content delivered as a service identified by a service ID and signaling information (not shown) are transmitted.

Further, in FIG. 11, the subtitle server 30 is provided on the Internet 90. The subtitle server 30 delivers subtitle information over the Internet 90.

In the use case 3, as broadcast content transmitted from the transmitting device 10, a TV program is delivered, for example. The receiving device 20 connects to the streams of audio and video of the broadcast content delivered from the transmitting device 10 to thereby play the TV program.

The receiving device 20 acquires trigger information transmitted in a video stream, at the timing that the transmitting device 10 delivers the trigger information (S31 of FIG. 11). The trigger information is subtitle trigger information in which "4" is designated as the command ID. The trigger information includes location information (Subtitle URL) and media time information (Media Time), in addition to header information such as a channel ID and a command ID.

The receiving device 20 sets media time information included in the trigger information, and starts clocking of the time according to the media time information (S32 of FIG. 11). Further, the receiving device 20 accesses the subtitle server 30 over the Internet 90 on the basis of the location information included in the trigger information to thereby obtain subtitle information (S33 of FIG. 11).

Here, subtitle information is configured of SIT information and a TTML document. SIT information includes hint information of a hybrid-type program or the like designated as an operation mode. Further, a TTML document is configured of an initialization document instance and a body document instance, and the content of the body document instance is also described completely. For example, in a p element in which the id is "p1", it is designated that a subtitle "Hello" is displayed from the display begin time "t1" until the display end time "t2". Further, in a p element in which the id is "p2", it is designated to display a subtitle "Nice to meet you".

Further, in the receiving device 20, while clocking of the time according to the media time information is started in the processing at step S32, it is regularly monitored whether the clocking time of the media time is within the display time of the subtitle designated in each p element listed in the body document instance (whether or not the display begin time has passed).

Then, when the clocking time of the media time becomes a time t1, as it is the display begin time of the subtitle designated in the p attribute of the id "p1", the receiving device 20 displays a character string "Hello" designated in the p element of the id "p1" as a subtitle, according to the rendering context designated in the initialization document instance. Thereby, in the receiving device 20, the subtitle "Hello" is superimposed on a video P31 of the TV program being played. It should be noted that in the receiving device 20, when the clocking time of the media time becomes a time t2, as it is the display end time of the subtitle designated in the p attribute of the id "p1", displaying of the subtitle "Hello" ends.

Then, at the timing that the transmitting device 10 delivers trigger information, the receiving device 20 acquires the trigger information transmitted in the video stream (S34 of FIG. 11). The trigger information is subtitle trigger information in which event information is designated in addition to the location information. In the event information, an id of a p element in the TTML document is designated. The receiving device 20 specifies a p element having an id matching that of the p element designated in the event information, among p elements listed in the body document instance of the TTML document. Here, a p element of an id "p2" is specified. As such, in the receiving device 20, a subtitle "Nice to meet you" is superimposed on a video P32 of the TV program being played.

Thereafter, the receiving device 20 acquires trigger information transmitted in the vide stream, at the timing that the transmitting device 10 delivers the trigger information (S36 of FIG. 11). In the append information included in the trigger information, a character string "Good-bye" is described as a content regarding a p element of the TTML document. According to the TTML document to which the content regarding the p element of the append information is added, the receiving device 20 displays a subtitle "Good-bye" on a video P33 of the TV program being played (S33 of FIG. 11).

In this way, in the receiving device 20, while the content of the TTML document acquired from the subtitle server 30 is completed, it can be said that it is a TTML document having a provisional content that may be changed according to the content of append information or event information included in trigger information to be delivered thereafter.

It should be noted that in FIG. 11, as the display begin time and the display end time of the subtitle are not designated in the event information or the append information, the subtitle is displayed immediately at the timing of acquiring the trigger information. However, it is possible to adjust the display timing of the subtitle by designating the display begin time and the display end time of the subtitle.

The use case 3 has been described above. In the use case 3, a TTML document that is a TTML document having a complete but provisional content is acquired from the subtitle server 30 on the Internet 90, on the basis of the location information included in the subtitle trigger information delivered from the transmitting device 10, and the content of the TTML document is finalized by append information or event information included in trigger information acquired thereafter. Then, according to the TTML document having the final content, a subtitle is displayed in a superimposed manner on a video of the TV program.

As described above, in the use case 3, as a subtitle is displayed on the basis of subtitle information acquired via communications, even if subtitle information cannot be acquired via broadcasting, it is possible to reliably acquire the subtitle information via communications and to display it in a superimposed manner on a video of the TV program in the receiving device 20.

(4) Use Case 4: Control of Subtitle Displayed in Superimposed Manner on Recorded Program (ACR Compliant)

Figure 12:
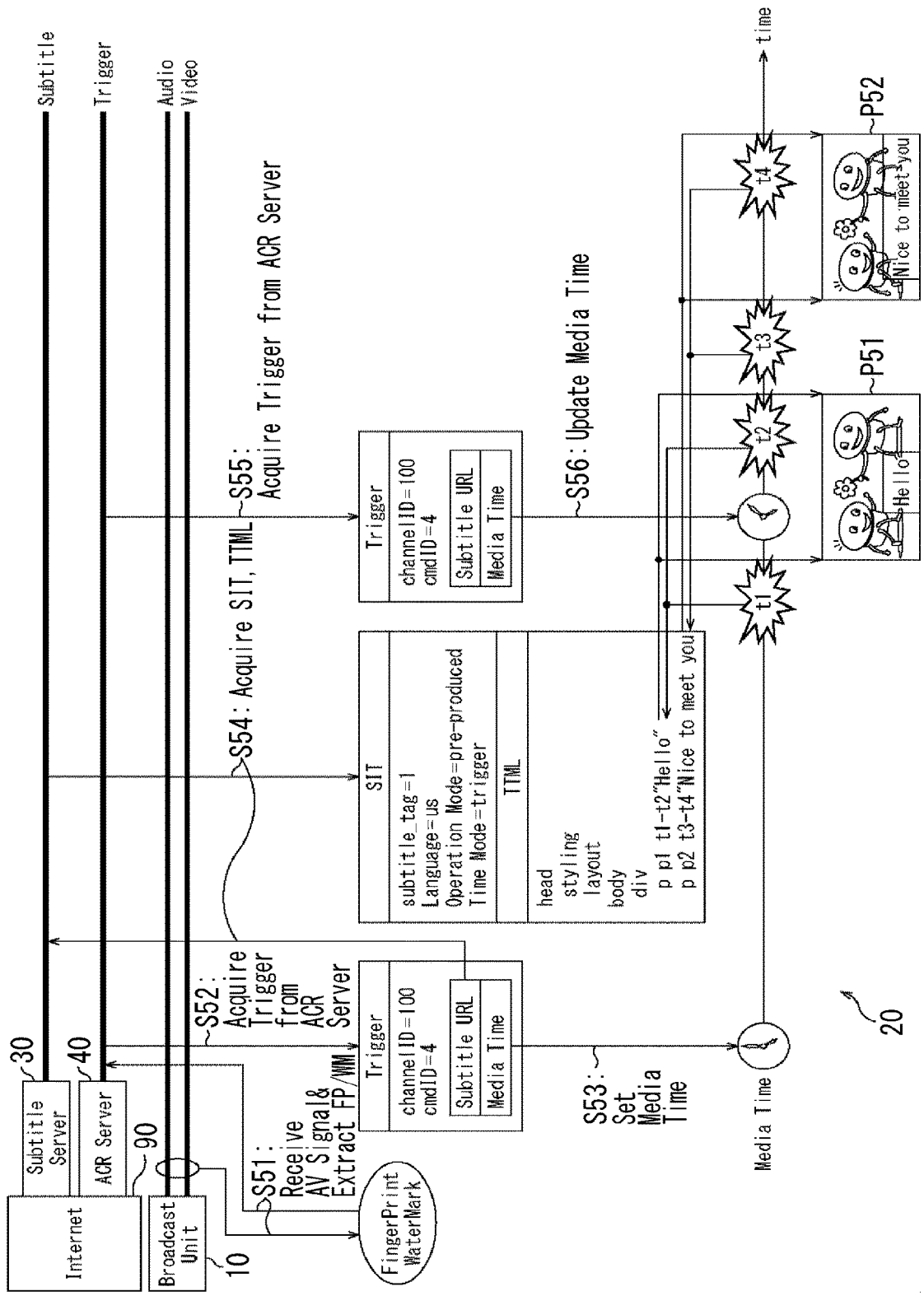
FIG. 12 is a diagram explaining a use case 4.

FIG. 12 is a diagram explaining a use case 4. The use case 4 shows the case where trigger information is not delivered from the transmitting device 10 but is delivered from an ACR server 40 on the Internet 90 in the use case 1 illustrated in FIG. 9.

In FIG. 12, the transmitting device 10 of a broadcasting station (broadcasting organization) transmits a BBP stream by digital broadcast signals using the IP transmission system, similarly to the case of FIG. 9 as described above. In the BBP stream, streams of components (audio/video) constituting broadcast content delivered as a service and the like are transmitted.

Further, in FIG. 12, the ACR server 40 is provided on the Internet 90, besides the subtitle server 30. The subtitle server 30 delivers subtitle information over the Internet 90. The ACR server 40 performs identification of content using Automatic Content Recognition (ACR) technology in response to an inquiry from the receiving device 20, and delivers trigger information corresponding to the identification result over the Internet 90.

In the use case 4, as broadcast content transmitted from the transmitting device 10, a recorded program such as a drama is delivered. The receiving device 20 connects to streams of audio and video of the broadcast content delivered from the transmitting device 10 to thereby play the recorded program.

The receiving device 20 transmits feature quantity (hereinafter referred to as "fingerprint information (Finger Print)) extracted from at least one of video data and audio data of the recorded program being played, to the ACR server 40 over the Internet 90 (S51 of FIG. 12). It should be noted that the fingerprint information is transmitted from the receiving device 20 to the ACR server 40 in a cycle of several seconds, for example.

When the ACR server 40 receives the fingerprint information from the receiving device 20, the ACR server 40 performs matching of the fingerprint information with the database to thereby identify the content being played on the receiving device 20 with use of the ACR technology, and generates trigger information corresponding to the identification result. The ACR server 40 transmits the trigger information, corresponding to the ACR identification result, to the receiving device 20 over the Internet 90.

It should be noted that in this case, watermark information (Water Mark) may be used instead of fingerprint information. In the case of using watermark information, information specifying a scene of the program can be included. In that case, there is no need to specify a scene of the program on the ACR server 40 side.

Then, the receiving device 20 acquires (receives) the trigger information delivered from the ACR server 40 over the Internet 90 (S52 of FIG. 12). This trigger information is subtitle trigger information in which "4" is designated as the command ID. The trigger information includes location information (Subtitle URL) and media time information (Media Time) in addition to header information such as a channel ID and a command ID.

In the receiving device 20, processing of steps S53 to S56, corresponding to the aforementioned steps S12 to S15 in FIG. 9, is performed. That is, in the receiving device 20, clocking of the time is started on the basis of the media time information included in the trigger information, and subtitle information is acquired from the subtitle server 30 over the Internet 90 (S53 and S54 of FIG. 12). The subtitle information is configured of SIT information as hint information and a TTML document having a complete content.

Then, in the receiving device 20, a subtitle "Hello" is superimposed on a video P51 of the recorded program being played during a period from the time t1 to the time t2 of the clocking time of the media time, and a subtitle "Nice to meet you" is superimposed on a video P52 of the recorded program being played during a period from the time t3 to the time t4. It should be noted that in the receiving device 20, when trigger information from the ACR server 40 is acquired in response to transmission of fingerprint information, the clocking time of the media time is updated (adjusted) on the basis of the media time information included in the trigger information (S55 and S56 of FIG. 12).

The use case 4 has been described above. In the use case 4, subtitle information including a TTML document having a complete content is acquired from the subtitle server 30 on the Internet 90 on the basis of location information included in subtitle trigger information delivered from the ACR server 40 over the Internet 90, and in response to the clocking time of the media time obtained from the subtitle trigger information, a subtitle designated in a p attribute of the TTML document is displayed in a superimposed manner on a video of the recorded program.

As described above, in the use case 4, as a subtitle is displayed on the basis of subtitle information acquired via communications in the receiving device 20, even if subtitle information cannot be acquired via broadcasting, it is possible to reliably acquire subtitle information via communications to thereby display a subtitle in a superimposed manner on a video of the recorded program.

(5) Use Case 5: Control of Subtitle Displayed in Superimposed Manner on Live Program (ACR Compliant)

Figure 13:
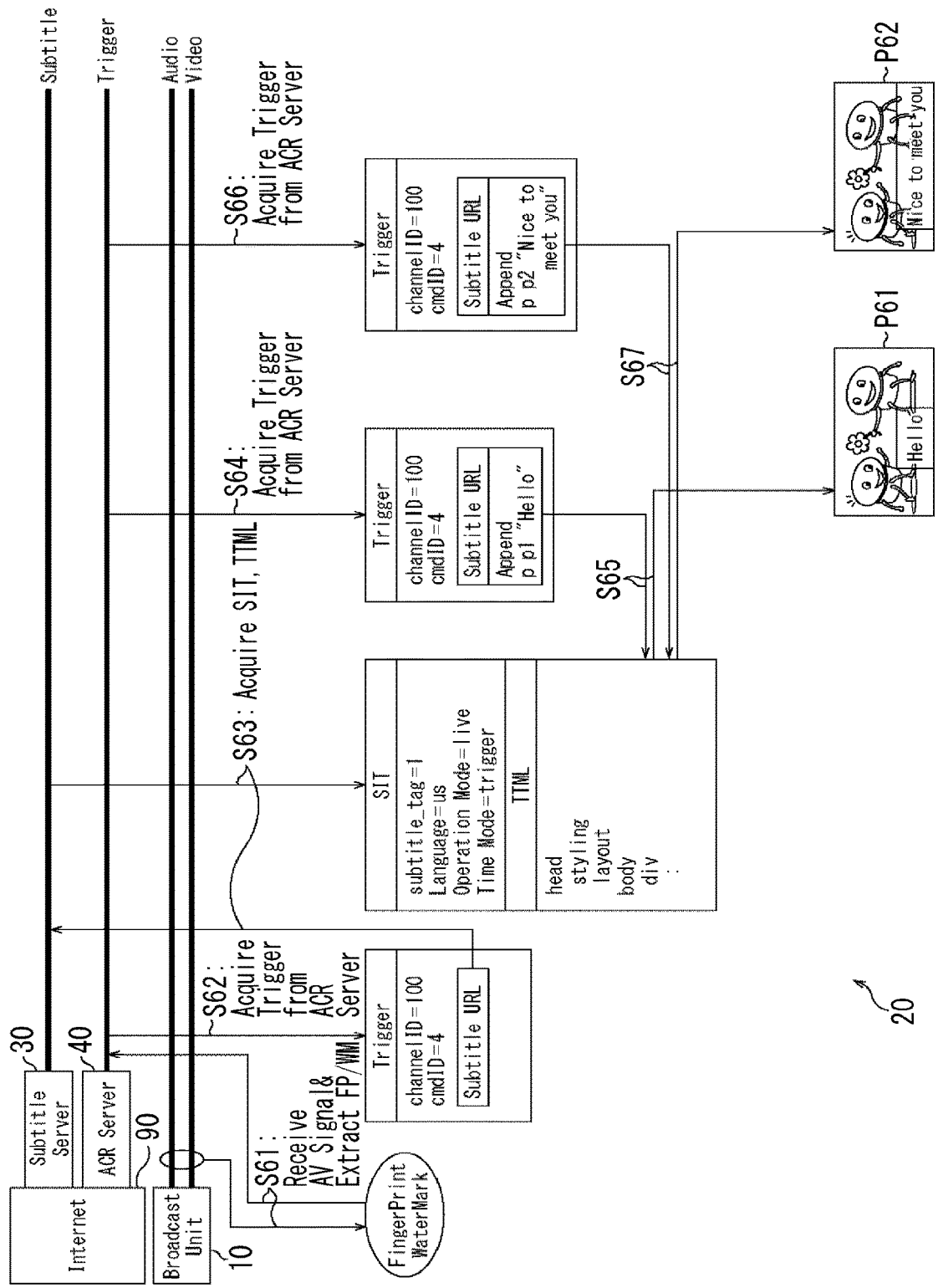
FIG. 13 is a diagram explaining a use case 5.

FIG. 13 is a diagram explaining a use case 5. The use case 5 shows the case where trigger information is not delivered from the transmitting device 10 but is delivered from the ACR server 40 on the Internet 90 in the use case 2 illustrated in FIG. 10.

In FIG. 13, the transmitting device 10 of a broadcasting station (broadcasting organization) transmits a BBP stream by digital broadcast signals using the IP transmission system, similarly to the case of FIG. 10 described above. In the BBP stream, streams of components (audio/video) constituting broadcast content delivered as a service and the like are transmitted.

Further, in FIG. 13, the ACR server 40 is provided on the Internet 90, besides the subtitle server 30. The ACR server 40 performs identification of content using the ACR technology in response to an inquiry from the receiving device 20, and delivers trigger information corresponding to the identification result over the Internet 90.

In the use case 5, as broadcast content transmitted from the transmitting device 10, a live program such as sport broadcasting is delivered, for example. The receiving device 20 connects to streams of audio and video of the broadcast content delivered from the transmitting device 10 to thereby play the live program.

The receiving device 20 transmits fingerprint information extracted from at least one of video data and audio data of the live program being played, to the ACR server 40 over the Internet 90 (S61 of FIG. 13). The ACR server 40 transmits trigger information, corresponding to the ACR identification result using the fingerprint information from the receiving device 20, to the receiving device 20 over the Internet 90. It should be noted that in this case, watermark information may be used instead of the fingerprint information.

Then, the receiving device 20 acquires (receives) the trigger information transmitted from the ACR server 40 over the Internet 90 (S62 of FIG. 13). The trigger information is subtitle trigger information in which "4" is designated as the command ID. The trigger information includes location information (Subtitle URL) in addition to header information such as a channel ID and a command ID.

In the receiving device 20, processing of steps S63 to 67, corresponding to the aforementioned steps S22 to S26 in FIG. 10, is performed. That is, in the receiving device 20, subtitle information is acquired from the subtitle server 30 over the Internet 90 (S63 of FIG. 13). The subtitle information is configured of SIT information as hint information and a TTML document as a template.

Then, in the receiving device 20, in the case where trigger information from the ACR server 40 is acquired in response to transmission of fingerprint information (S64 and S66 of FIG. 13), the content regarding a p element of the append information included in the trigger information is added to the TTML document as a template, whereby the content of the TTML document is completed. Thereby, in the receiving device 20, a subtitle "Hello" is superimposed on a video 61 of the live program being played (S65 of FIG. 13), and then, a subtitle "Nice to meet you" is superimposed on a video 62 of the live program being played (S67 of FIG. 13).

The use case 5 has been described above. In the use case 5, a TTML document as a template is acquired from the subtitle server 30 on the Internet 90 on the basis of the location information included in the subtitle trigger information delivered from the ACR server 40 over the Internet 90, and with the append information included in the trigger information acquired thereafter, the content of the TTML document is completed. Then, with the TTML document having a complete content, subtitles are displayed in a superimposed manner.

As described above, in the use case 5, as a subtitle is displayed on the basis of subtitle information acquired via communications in the receiving device 20, even if subtitle information cannot be acquired via broadcasting, it is possible to reliably acquire subtitle information via communications to thereby display a subtitle in a superimposed manner on a video of the live program. Further, in the use case 5, a TTML document as a template is delivered in advance and difference information for completing the content of the TTML document is delivered by trigger information. Accordingly, it is possible to reduce the load on the subtitle server 30, the ACR server 40, and the Internet 90 by reducing the amount of information handled at a time.

(6) Use Case 6: Control of Hybrid-Type Subtitle (ACR Compliant)

Figure 14:
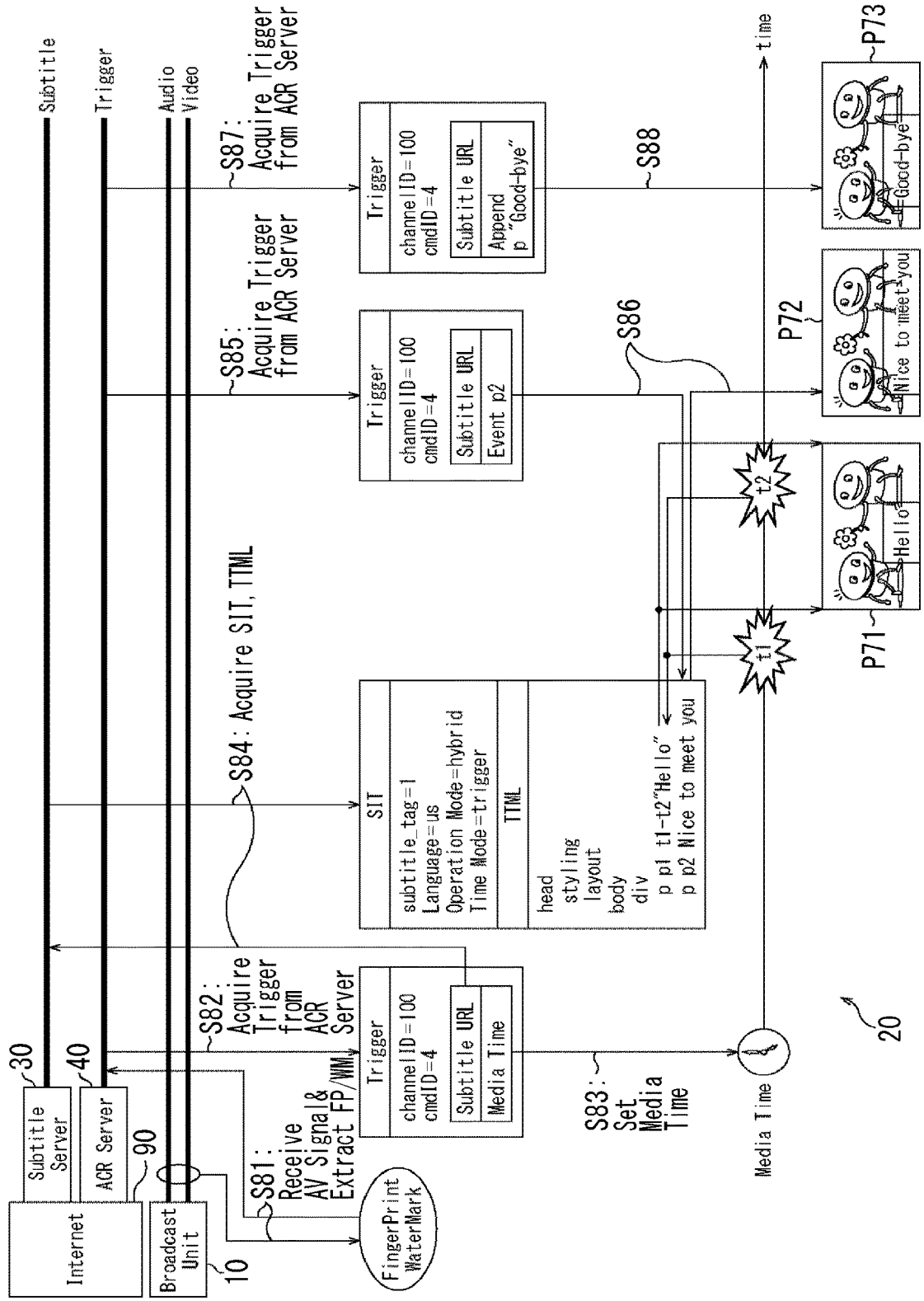
FIG. 14 is a diagram explaining a use case 6.

FIG. 14 is a diagram explaining a use case 6. The use case 6 shows the case where trigger information is not delivered from the transmitting device 10 but is delivered from the ACR server 40 on the Internet 90 in the use case 3 illustrated in FIG. 11.

In FIG. 14, the transmitting device 10 of a broadcasting station (broadcasting organization) transmits a BBP stream by digital broadcast signals using the IP transmission system, similarly to the case of FIG. 11 described above. In the BBP stream, streams of components (audio/video) constituting broadcast content delivered as a service and the like are transmitted.

Further, in FIG. 14, the ACR server 40 is provided on the Internet 90, besides the subtitle server 30. The ACR server 40 performs identification of content using the ACR technology in response to an inquiry from the receiving device 20, and delivers trigger information corresponding to the identification result over the Internet 90.

In the use case 6, as broadcast content transmitted from the transmitting device 10, a TV program is delivered, for example. The receiving device 20 connects to streams of audio and video of the broadcast content delivered from the transmitting device 10 to thereby play the TV program.

The receiving device 20 transmits fingerprint information extracted from at least one of video data and audio data of the TV program being played, to the ACR server 40 over the Internet 90 (S81 of FIG. 14). The ACR server 40 transmits trigger information, corresponding to the ACR identification result using the fingerprint information from the receiving device 20, to the receiving device 20 over the Internet 90. It should be noted that in this case, watermark information may be used instead of the fingerprint information.

Then, the receiving device 20 acquires (receives) trigger information transmitted from the ACR server 40 over the Internet 90 (S82 of FIG. 14). The trigger information is subtitle trigger information in which "4" is designated as the command ID. The trigger information includes location information (Subtitle URL) and media time information (Media Time), in addition to header information such as a channel ID and a command ID.

In the receiving device 20, processing of steps S83 to S88, corresponding to the aforementioned steps S32 to S37 in FIG. 11, is performed. That is, in the receiving device 20, clocking of the time according to the media time information included in the trigger information is started, and subtitle information is acquired from the subtitle server 30 over the Internet 90 (S83 and S84 of FIG. 14). The subtitle information is configured of SIT information as hint information, and a TTML document having a complete but provisional content.

Then, in the receiving device 20, a subtitle "Hello" is superimposed on a video P71 of the TV program during a period from the time t1 to the time t2 of the clocking time of the media time. Further, in the receiving device 20, in the case where trigger information from the ACR server 40 is acquired in response to transmission of the fingerprint information (S85 of FIG. 14), a subtitle "Nice to meet you" is superimposed on a video P72 of the TV program being played, by a p element designated by the event information (S86 of FIG. 14). Further, in the receiving device 20, in the case where trigger information from the ACR server 40 is acquired in response to transmission of the fingerprint information (S87 of FIG. 14), a subtitle "Good-bye" is superimposed on a video P73 of the TV program being played (S88 of FIG. 14).

The use case 6 has been described above. In the use case 6, a TTML document having a complete but provisional content is acquired from the subtitle server 30 on the Internet 90 on the basis of location information included in the subtitle trigger information delivered from the ACR server 40 over the Internet 90, and with the append information and event information included in the trigger information acquired thereafter, the content of the TTML document is finalized. Then, with the TTML document having the finalized content, a subtitle is displayed in a superimposed manner on a video of the TV program.

As described above, in the use case 6, as a subtitle is displayed on the basis of subtitle information acquired via communications in the receiving device 20, even if subtitle information cannot be acquired via broadcasting, it is possible to reliably acquire subtitle information via communications to thereby display a subtitle in a superimposed manner on a video of the TV program.

It should be noted that in the use cases 4 to 6, when the receiving device 20 transmits fingerprint information to the ACR server 40, the receiving device 20 may request subtitle trigger information. Thereby, in the receiving device 20, it is possible to acquire subtitle trigger information at the timing when subtitle information is required, and acquire subtitle information from the subtitle server 30, for example.

<4. System Configuration>
(Exemplary Configuration of Broadcast Communication System)

Figure 15:
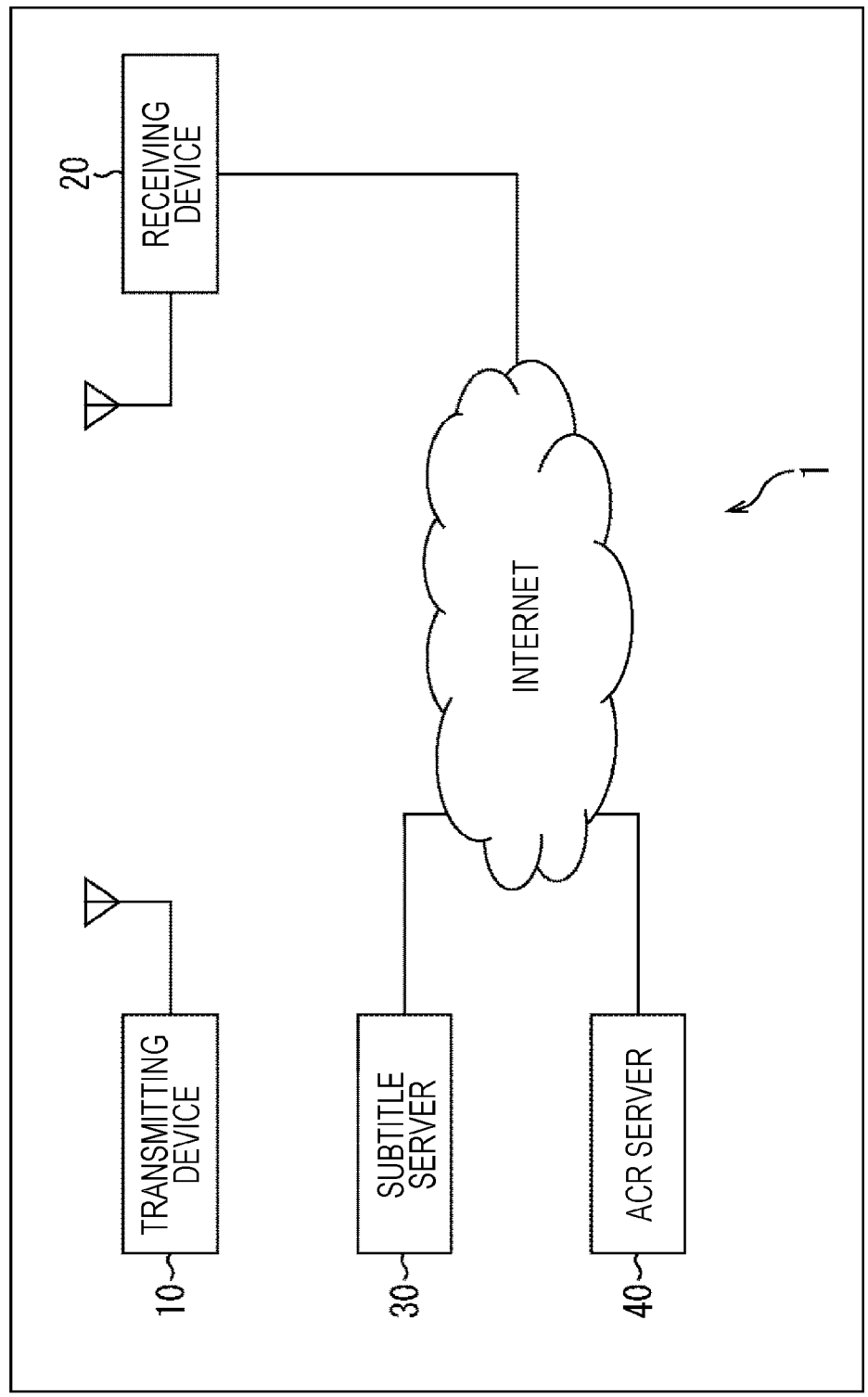
FIG. 15 is a diagram illustrating an exemplary configuration of a broadcast communication system.

FIG. 15 is a diagram illustrating an exemplary configuration of a broadcast communication system. It should be noted that a system means a set of configuration elements (devices and the like).

A broadcast communication system 1 of FIG. 15 has a configuration for realizing control of subtitles using trigger information (subtitle trigger information) and subtitle information in the use cases 1 to 6 described above. That is, in FIG. 15, the broadcast communication system 1 includes the transmitting device 10, the receiving device 20, the subtitle server 30, and the ACR server 40. Further, the receiving device 20 is mutually connected with the subtitle server 30 and with the ACR server 40 over the Internet 90.

The transmitting device 10 transmits broadcast content such as a recorded program and a live program, and signaling information, by digital broadcast signals. The transmitting device 10 also transmits trigger information (subtitle trigger information of FIG. 1) for providing a function relating to subtitles by including the trigger information in digital broadcast signals. It should be noted that the transmitting device 10 is provided by a broadcasting organization or the like.

The receiving device 20 is a television receiver capable of receiving digital broadcast signals, which is installed in a house or the like, for example. The receiving device 20 receives digital broadcast signal transmitted from the transmitting device 10. The receiving device 20 plays broadcast content of a recorded program, a live program, or the like, on the basis of signaling information obtained from the digital broadcast signals.

The receiving device 20 also receives digital broadcast signals from the transmitting device 10 to thereby acquire trigger information. The receiving device 20 accesses the subtitle server 30 over the Internet 90 on the basis of the trigger information and acquires subtitle information. The receiving device 20 controls displaying of subtitles on the basis of at least one of the trigger information and the subtitle information.

The subtitle server 30 delivers subtitle information to the receiving device 20 over the Internet 90 in response to a request from the receiving device 20. It should be noted that the subtitle information is configured of a TTML document and SIT information. Further, the subtitle server 30 is provided by a broadcasting organization or the like.

Further, the receiving device 20 connects to the ACR server 40 over the Internet 90 to inquire trigger information. At that time, the receiving device 20 transmits fingerprint information to the ACR server 40. The receiving device 20 acquires the trigger information transmitted from the ACR server 40, accesses the subtitle server 30 on the basis of the trigger information, and acquires subtitle information.

In response to the inquiry from the receiving device 20, the ACR server 40 performs ACR processing on the fingerprint information and identifies the broadcast content played in the receiving device 20. The ACR server 40 generates trigger information (subtitle trigger information of FIG. 1) corresponding to the ACR identification result, and transmits it to the receiving device 20 over the Internet 90. It should be noted that it is necessary to install the ACR server 40 in the case of use cases 4 to 6 among the use cases 1 to 6.

The broadcast communication system 1 is configured as described above. Next, exemplary configurations of respective devices constituting the broadcast communication system 1 of FIG. 15 will be described.

(Exemplary Configuration of Transmitting Device)

Figure 16:
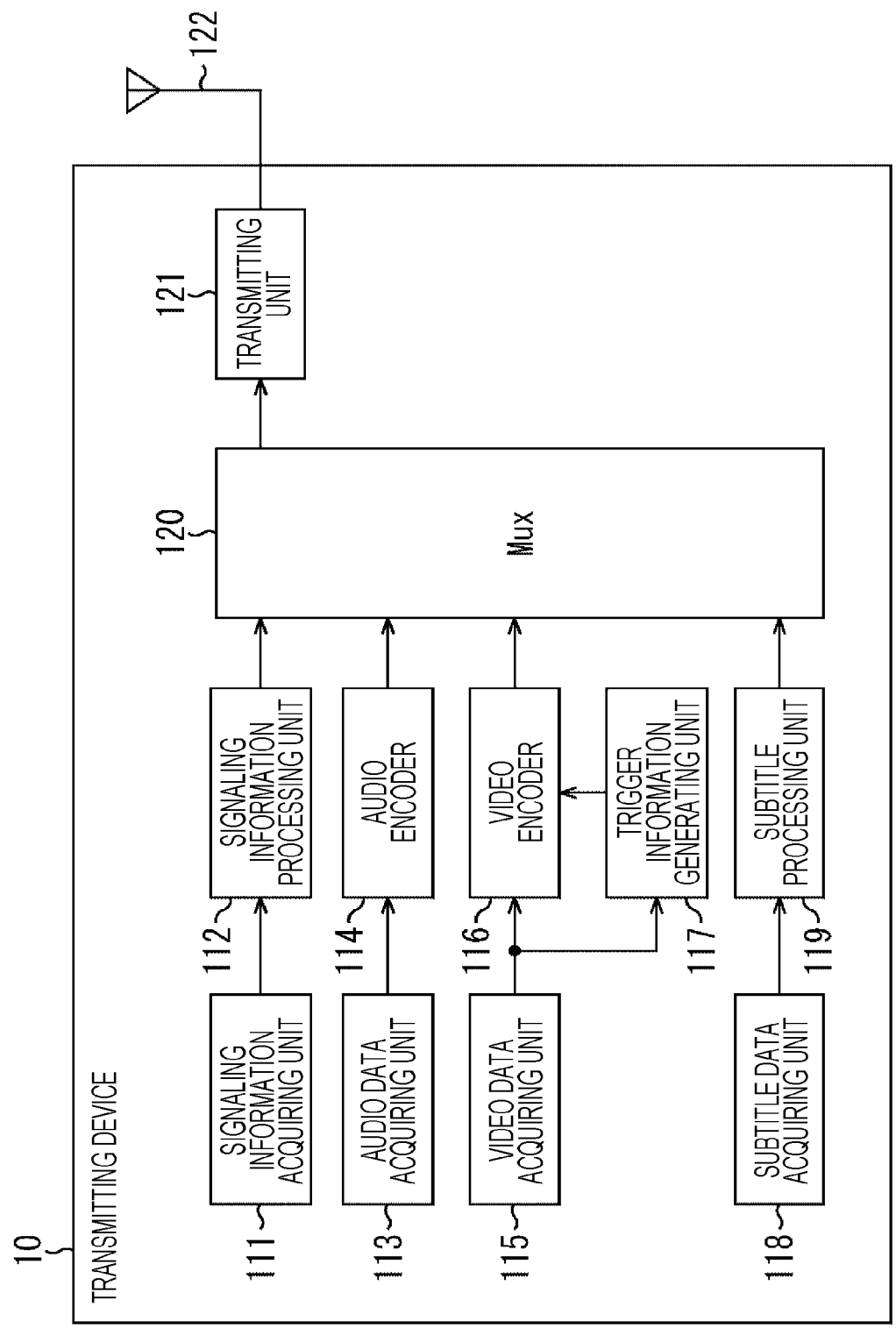
FIG. 16 is a diagram illustrating an exemplary configuration of a transmitting device.

FIG. 16 is a diagram illustrating an exemplary configuration of the transmitting device 10 of FIG. 15.

In FIG. 16, the transmitting device 10 is configured of a signaling information generating unit 111, a signaling information processing unit 112, an audio data acquiring unit 113, an audio encoder 114, a video data acquiring unit 115, a video encoder 116, a trigger information generating unit 117, a subtitle data acquiring unit 118, a subtitle processing unit 119, a Mux 120, and a transmitting unit 121.

The signaling information generating unit 111 generates signaling information, and supplies it to the signaling information processing unit 112. The signaling information processing unit 112 processes the signaling information supplied from the signaling information generating unit 111, and supplies the processed information to the Mux 120.

The audio data acquiring unit 113 acquires audio data of broadcast content from an external server, a microphone, a recording medium, or the like, and supplies it to the audio encoder 114. The audio encoder 114 encodes the audio data supplied from the audio data acquiring unit 113 in conformity to an encoding system such as Moving Picture Experts Group (MPEG), and supplies the encoded data to the Mux 120.

The video data acquiring unit 115 acquires video data of the broadcast content from an external server, a camera, a recording medium, or the like, and supplies it to the video encoder 116 and the trigger information generating unit 117. The video encoder 116 encodes the video data supplied from the video data acquiring unit 115 in conformity to an encoding system such as MPEG, and supplies the encoded data to the Mux 120.

The trigger information generating unit 117 generates trigger information (subtitle trigger information of FIG. 1) for providing a function relating to subtitles at a predetermined timing, and supplies it to the video encoder 116 or the Mux 120. For example, the trigger information generating unit 117 generates trigger information on the basis of the video data supplied from the video data acquiring unit 115, along with the progress of the broadcast content. When encoding the video data, the video encoder 116 is able to perform encoding while embedding the trigger information supplied from the trigger information generating unit 117.

The subtitle data acquiring unit 118 acquires subtitle data of the broadcast content from an external server, a recording medium, or the like, and supplies it to the subtitle processing unit 119. The subtitle processing unit 119 processes the subtitle data supplied from the subtitle data acquiring unit 118, and supplies the processed data to the Mux 120.

The Mux 120 multiplexes the signaling information stream from the signaling information processing unit 112, an audio stream from the audio encoder 114, a video stream from the video encoder 116, and a subtitle stream from the subtitle processing unit 119, and supplies the resultant BBP stream to the transmitting unit 121.

It should be noted that in the case where subtitle data does not exist in the broadcast content, subtitle data is not acquired by the subtitle data acquiring unit 118. As such, the Mux 120 multiplexes the signaling information stream, the audio stream, and the video stream to generate a BBP stream. Further, if the trigger information is supplied from the trigger information generating unit 117, the Mux 120 multiplexes the signaling information stream, the audio stream, the video stream, the subtitle stream, and further the trigger information to generate a BBP stream.

The transmitting unit 121 transmits the BBP stream supplied from the Mux 120 as digital broadcast signals via an antenna 122.

It should be noted that in FIG. 16, the case where trigger information is embedded in video data and the case where it is multiplexed in a BBP stream have been exemplarily described. However, it is possible to arrange trigger information by another method such as embedding trigger information in audio data, for example.

(Exemplary Configuration of Receiving Device)

Figure 17:
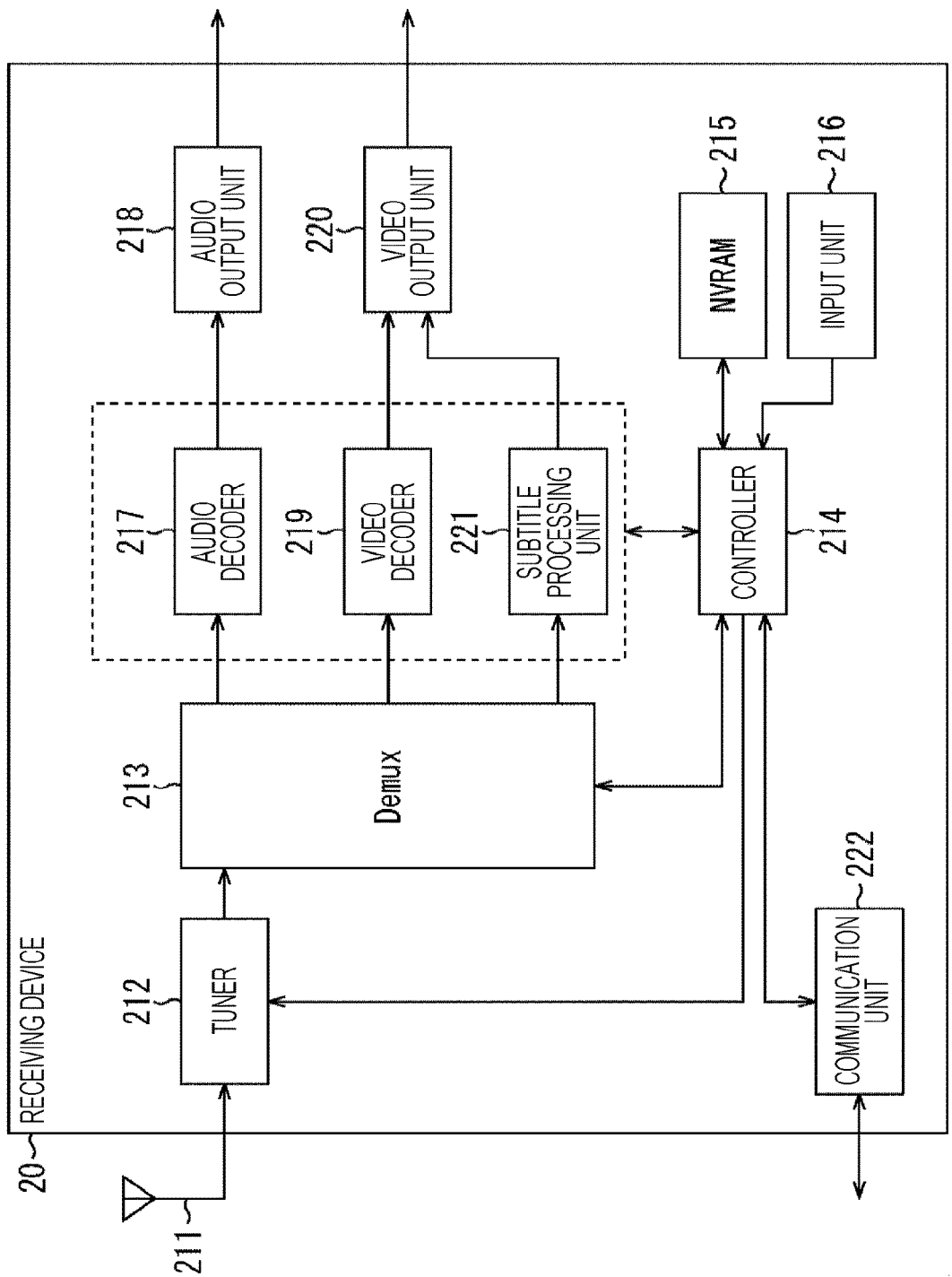
FIG. 17 is a diagram illustrating an exemplary configuration of a receiving device.

FIG. 17 is a diagram illustrating an exemplary configuration of the receiving device 20 of FIG. 15.

In FIG. 17, the receiving device 20 is configured of a tuner 212, a Demux 213, a controller 214, an NVRAM 215, an input unit 216, an audio decoder 217, an audio output unit 218, a video decoder 219, a video output unit 220, a subtitle processing unit 221, and a communication unit 222.

The tuner 212 extracts and demodulates digital broadcast signals corresponding to the tuning operation by a user, from the broadcast wave (digital broadcast signal) of the digital broadcasting using the IP transmission system received via an antenna 211, in accordance with control from the controller 214, and supplies the resultant BBP stream to the Demux 213.

The Demux 213 separates the BBP stream supplied from the tuner 212 into audio and video streams and signaling information, in accordance with control from the controller 214. The Demux 213 supplies the audio data to the audio decoder 217, the vide data to the video decoder 219, and the signaling information to the controller 214, respectively. It should be noted that if a subtitle stream is separated from the BBP stream, the Demux 213 supplies the subtitle data to the subtitle processing unit 221.

The controller 214 controls operation of each unit of the receiving device 20. The controller 214 also controls operation of each unit in order to acquire streams of (audio and video constituting) the broadcast content, on the basis of the signaling information supplied from the Demux 213. It should be noted that the details of the configuration of the controller 214 will be described below with reference to FIG. 18.

The NVRAM 215 is a nonvolatile memory. The NVRAM 215 records various types of data in accordance with control from the controller 214. The input unit 216 supplies operation signals to the controller 214 in accordance with an operation by a user.

To the audio decoder 217, audio data is supplied from the Demux 213. The audio decoder 217 decodes the audio data in conformity to a decoding system such as MPEG in accordance with control from the controller 214, and supplies the decoded data to the audio output unit 218. The audio output unit 218 outputs the audio data supplied from the audio decoder 217 to a speaker (not shown) in the latter stage. Thereby, the audio of the broadcast content is output from the speaker.

To the video decoder 219, video data is supplied from the Demux 213. The video decoder 219 decodes the video data in conformity to a decoding system such as MPEG in accordance with control from the controller 214, and supplies the decoded data to the video output unit 220. The video output unit 220 outputs the video data supplied from the video decoder 219 to a display (not shown) in the latter stage. Thereby, the video of the broadcast content is displayed on the display.

To the subtitle processing unit 221, subtitle data is supplied from the Demux 213. The subtitle processing unit 221 processes the subtitle data and supplies it to the video output unit 220, according to control from the controller 214. The video output unit 220 allows a subtitle corresponding to the subtitle data from the subtitle processing unit 221 to be displayed on a video of the video data from the video decoder 219 in a superimposed manner. Thereby, a subtitle superimposed on the video of the broadcast content is displayed on the display.

The communication unit 222 accesses each server over the Internet 90 in accordance with control from the controller 214 to thereby exchange various types of information.

(Exemplary Configuration of Controller)

Figure 18:
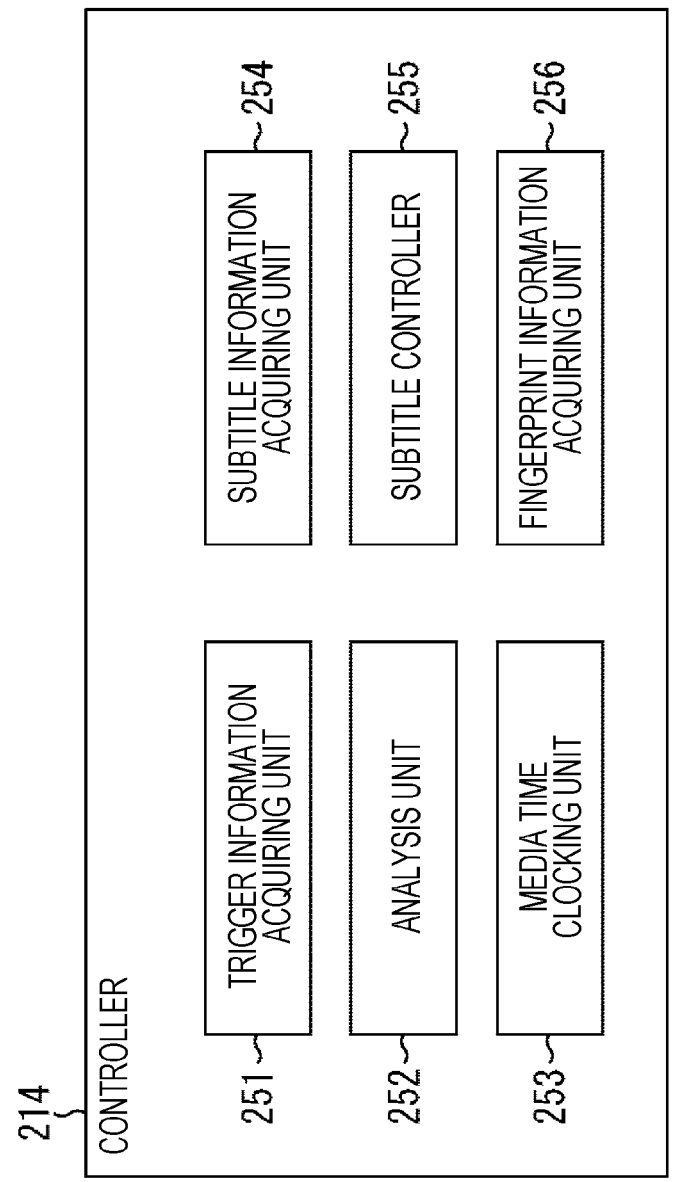
FIG. 18 is a diagram illustrating an exemplary configuration of a controller.

FIG. 18 is a diagram illustrating an exemplary functional configuration of parts performing processing relating to trigger information for providing various types of functions in the controller 214 of FIG. 17.

In FIG. 18, the controller 214 is configured of a trigger information acquiring unit 251, an analysis unit 252, a media time clocking unit 253, a subtitle information acquiring unit 254, a subtitle controller 255, and a fingerprint information acquiring unit 256.

The trigger information acquiring unit 251 regularly monitors video data output from the video decoder 219, acquires trigger information embedded in the video data, and supplies it to the analysis unit 252. It should be noted that if trigger information is arranged in a BBP stream, the trigger information acquiring unit 251 monitors a packet including trigger information separated by the Demux 213, and acquires trigger information therefrom.

The analysis unit 252 analyzes the trigger information supplied from the trigger information acquiring unit 251, and supplies the analysis result to the media time clocking unit 253, the subtitle information acquiring unit 254, or the subtitle controller 255. The media time clocking unit 253 sets media time information supplied from the analysis unit 252, and performs clocking of the time according to the media time information.

The subtitle information acquiring unit 254 controls the communication unit 222 (FIG. 17) on the basis of location information supplied from the analysis unit 252 to access the subtitle server 30 over the Internet 90. The subtitle information acquiring unit 254 controls the communication unit 222 (FIG. 17) to acquire subtitle information transmitted from the subtitle server 30 over the Internet 90, and supplies it to the analysis unit 252.

The analysis unit 252 analyzes the subtitle information supplied from the subtitle information acquiring unit 254, and supplies the analysis result to the subtitle controller 255. The subtitle controller 255 controls the subtitle processing unit 221 (FIG. 17) and controls displaying of subtitles, on the basis of the analysis result of the trigger information and the subtitle information supplied from the analysis unit 252.

The fingerprint information acquiring unit 256 acquires (extracts) fingerprint information from at least one of audio data output form the audio decoder 217 and video data output from the video decoder 219. The fingerprint information acquiring unit 256 controls the communication unit 222 (FIG. 17) to access the ACR server 40 over the Internet 90 to transmit fingerprint information. The trigger information acquiring unit 251 controls the communication unit 222 (FIG. 17) to acquire trigger information transmitted from the ACR server 40 over the Internet 90, and supplies it to the analysis unit 252.

(Exemplary Configuration of Each Server)

Figure 19:
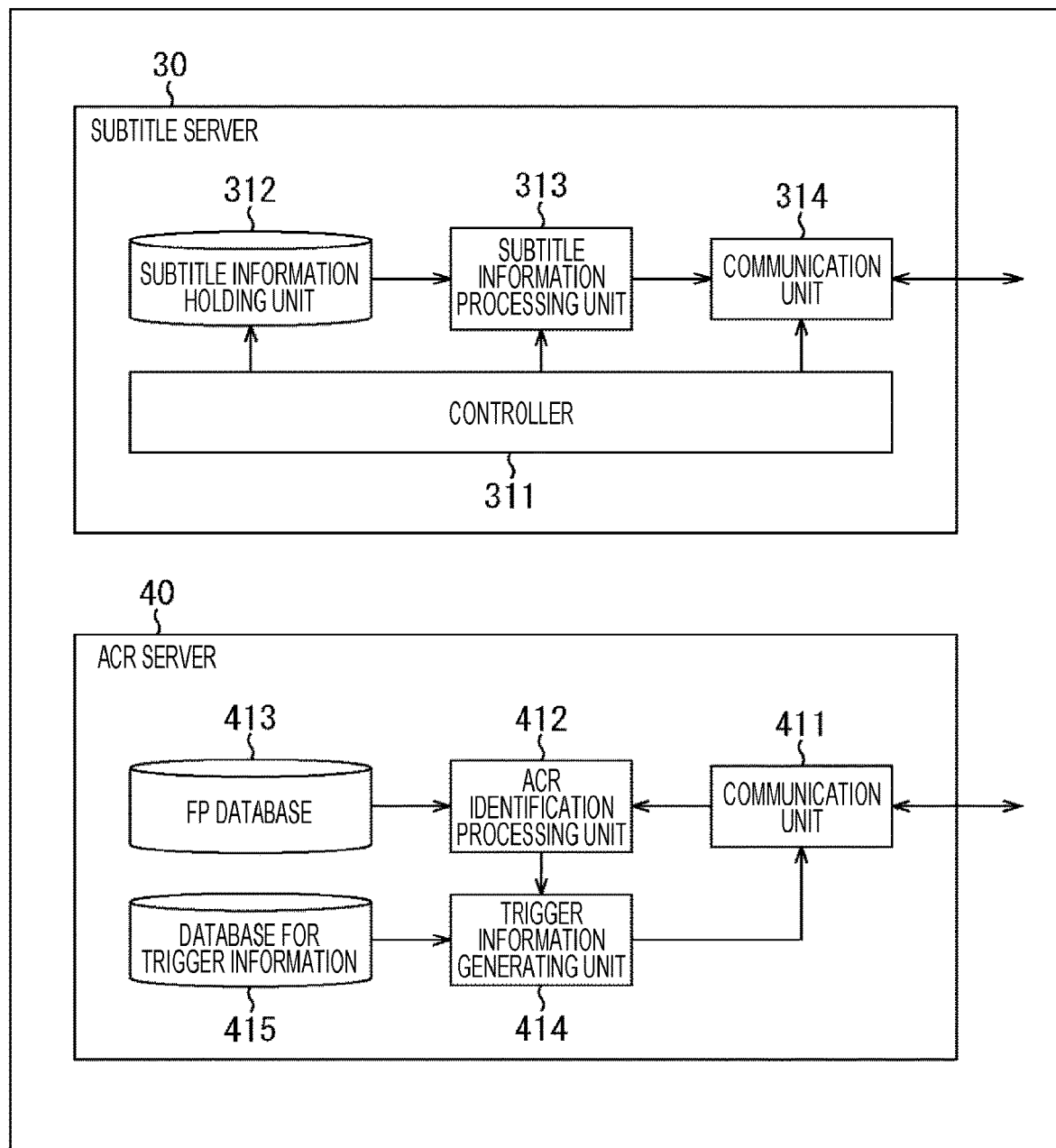
FIG. 19 is a diagram illustrating an exemplary configuration of each server.

FIG. 19 is a diagram illustrating an exemplary configuration of each server of FIG. 15. FIG. 19 illustrates configurations of the subtitle server 19 and the ACR server 40.

(Exemplary Configuration of Subtitle Server)

In FIG. 19, the subtitle server 30 is configured of a controller 311, a subtitle information holding unit 312, a subtitle information processing unit 313, and a communication unit 314. The controller 311 controls operation of respective units of the subtitle server 30. The subtitle information holding unit 312 holds SIT information as subtitle information and a TTML document. The subtitle information processing unit 313 performs processing to deliver the SIT information and the TTML document, held in the subtitle information holding unit 312, as subtitle information.

The communication unit 314 performs communications with the receiving device 20 over the Internet 90 in accordance with control from the controller 311. The controller 311 regularly monitors the communicating state of the communication unit 314, and determines whether or not delivery of subtitle information is requested from the receiving device 20. When delivery of subtitle information is requested from the receiving device 20, the subtitle information processing unit 313 generates subtitle information on the basis of the SIT information and the TTML document held in the subtitle information holding unit 312 and supplies it to the communication unit 314, in accordance with control from the controller 311. The communication unit 314 delivers subtitle information generated by the subtitle information processing unit 313 to the receiving device 20 that is the requestor, over the Internet 90.

The subtitle server 30 is configured as described above.

(Exemplary Configuration of ACR Server)

In FIG. 19, the ACR server 40 is configured of a communication unit 411, an ACR identification processing unit 412, a FP database 413, a trigger information generating unit 414, and a database 415 for trigger information. The communication unit 411 performs communications with the receiving device 20 over the Internet 90. When the communication unit 411 receives an inquiry about trigger information from the receiving device 20, the communication unit 411 receives fingerprint information and supplies it to the ACR identification processing unit 412.

The ACR identification processing unit 412 performs matching between the fingerprint information supplied from the communication unit 411 with the FP database 413 prepared in advance, and performs an ACR identification process to identify the broadcast content being played in the receiving device 20. The ACR identification processing unit 412 supplies the result of the ACR identification process to the trigger information generating unit 414.

It should be noted that fingerprint information (feature quantity) is unique information of the entire or partial configuration element of the broadcast content. In the FP database 413, unique information of a large number of pieces of content has been registered in advance. In the ACR identification process, similarity or agreement of such unique information is determined, for example. Further, as a method of determining similarity or agreement, publicly known technologies disclosed in various types of documents can be used.

The trigger information generating unit 414 generates trigger information (subtitle trigger information of FIG. 1) for providing a function relating to subtitles, on the basis of the result of ACR identification process supplied from the ACR identification processing unit 412 and the various types of information registered in the database 415 for trigger information, and supplies it to the communication unit 411. The communication unit 411 transmits the trigger information supplied from the trigger information generating unit 414 to the receiving device 20 that is the inquirer, over the Internet 90.

The ACR server 40 is configured as described above.

<5. Flow of Process Executed by Each Device>

Next, flows of processes executed by respective devices constituting the broadcast communication system 1 of FIG. 15 will be described with reference to the flowcharts of FIGS. 20 to 29.

(Digital Broadcast Signal Transmitting Process)

Figure 20:
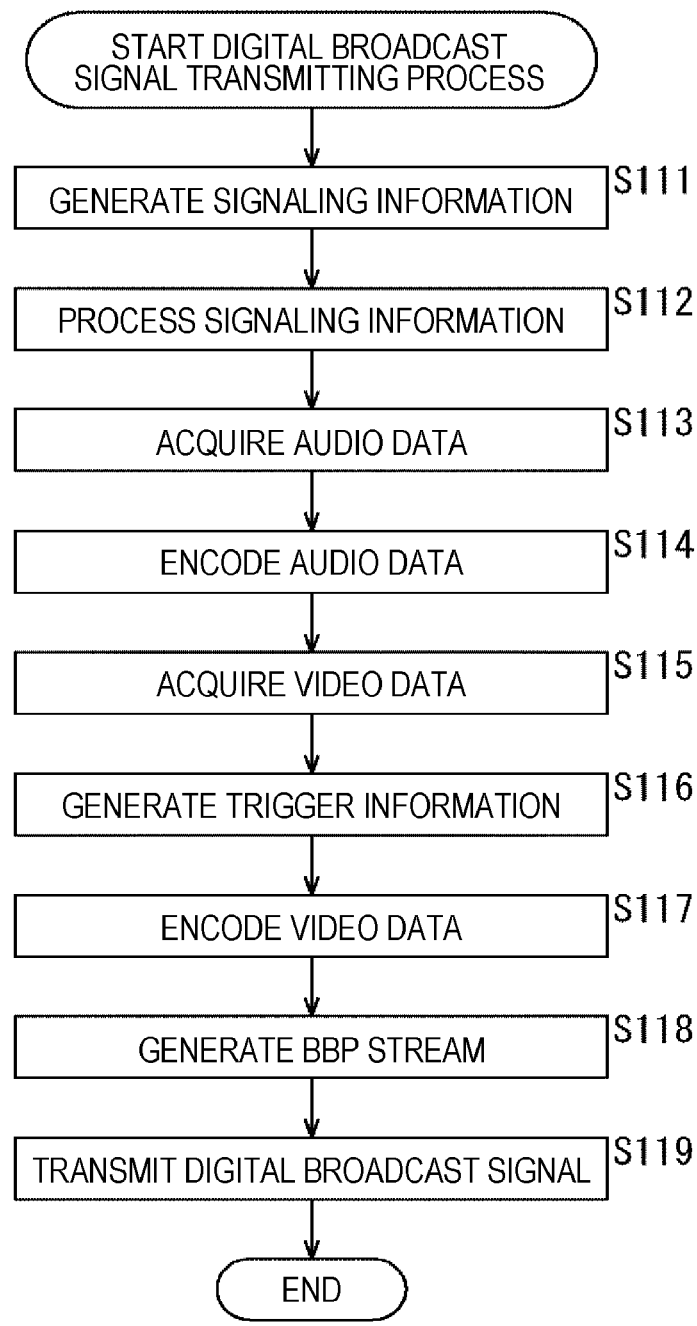
FIG. 20 is a flowchart explaining a flow of digital broadcast signal transmitting process.

First, a flow of a digital broadcast signal transmitting process executed by the transmitting device 10 of FIG. 15 will be described with reference to the flowchart of FIG. 20.

At step S111, the signaling information generating unit 111 generates signaling information. At step S112, the signaling information processing unit 112 processes the signaling information generated in the process of step S111.

At step S113, the audio data acquiring unit 113 acquires audio data of the broadcast content from an external server or the like. At step S114, the audio encoder 114 encodes the audio data, acquired in the process of step S113, in conformity to an encoding system such as MPEG.

At step S115, the video data acquiring unit 115 acquires video data of the broadcast content from an external server or the like. At step S116, the trigger information generating unit 117 generates trigger information (subtitle trigger information of FIG. 1) for providing a function relating to subtitles.

At step S117, the video encoder 116 encodes the video data acquired in the process of step S115 in conformity to an encoding system such as MPEG. However, when encoding the video data, the video encoder 116 performs encoding by embedding the trigger information, supplied from the trigger information generating unit 117, in the video data.

At step S118, the Mux 120 multiplexes the signaling information processed at step S112, the audio data encoded at step S114, and video data encoded at step S117, and supplies the resultant BBP stream to the transmitting unit 121.

At step S119, the transmitting unit 121 transmits the BBP stream, generated in the process of step S118, as digital broadcast signals using an IP transmission system via the antenna 122. When the process of step S119 ends, the digital broadcast signal transmitting process of FIG. 20 ends.

The digital broadcast signal transmitting process has been described above. It should be noted that in the digital broadcast signal transmitting process of FIG. 20, the case where trigger information is embedded in video data has been described exemplarily for simplifying the description.
(Digital Broadcast Signal Receiving Process)

Figure 21:
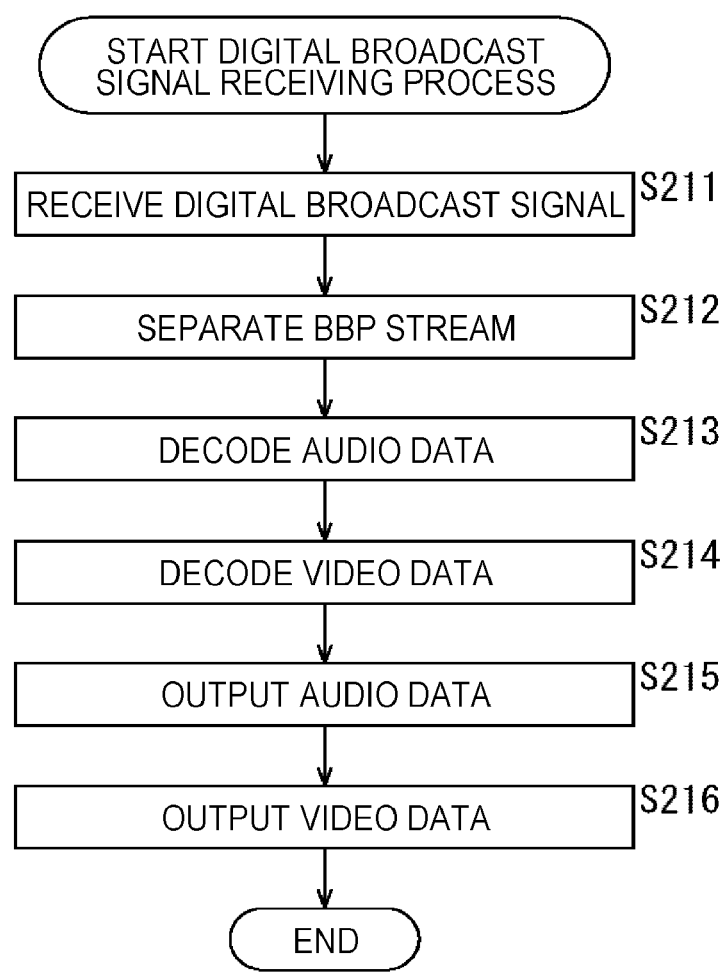
FIG. 21 is a flowchart explaining a flow of digital broadcast signal receiving process.

Next, a flow of a digital broadcast signal receiving process executed by the receiving device 20 of FIG. 15 will be described with reference to the flowchart of FIG. 21.

At step S211, the tuner 212 performs tuning and demodulating of the digital broadcast signals using the IP transmission system received via the antenna 211. Further, at step S212, the Demux 213 separates audio data and video data from the BBP stream decoded in the process of step S211.

At step S213, the audio decoder 217 decodes the audio data separated in the process of step S212 by a decoding system corresponding to the encoding system used by the audio encoder 114 (FIG. 16). Further, at step S214, the video decoder 219 decodes the video data separated in the process of step S212 by a decoding system corresponding to the encoding system used by the video encoder 116 (FIG. 16).

At step S215, the audio output unit 218 outputs the audio data decoded in the process of step S213 to a speaker (not shown) in the latter stage. Further, at step S216, the video output unit 220 outputs the video data decoded in the process of step S214 to a display (not shown) in the latter stage. Thereby, a video of the broadcast content is displayed on the display, and audio synchronized with the video is output from the speaker. When the process of step S216 ends, the digital broadcast signal receiving process of FIG. 21 ends.

The flow of the digital broadcast signal receiving process has been described above.
(Control Process of Subtitle Displayed in Superimposed Manner on Recorded Program)

Next, a flow of a control process of subtitles displayed in a superimposed manner on a recorded program, which is executed by the receiving device 20 of FIG. 15, will be described with reference to the flowchart of FIG. 22. It should be noted that prior to the control process of subtitles displayed in a superimposed manner on a recoded program, it is assumed that in the receiving device 20, the digital broadcast signal receiving process of FIG. 21 has been performed and a recorded program such as a drama is being played as broadcast content, for example.

At step S221, the trigger information acquiring unit 251 begins monitoring of trigger information embedded in video data output from the video decoder 219. At step S222, the trigger information acquiring unit 251 determines whether or not trigger information embedded in the video data has been acquired, on the basis of the monitoring result of the processing of step S221.

At step S222, when it is determined that trigger information has not been acquired, the determination process of step S222 is repeated. At step S222, it is waited until trigger information is acquired by the trigger information acquiring unit 251, and then the process proceeds to step S223.

It should be noted that the trigger information acquired by the trigger information acquiring unit 251 is analyzed by the analysis unit 252. The trigger information acquired here is subtitle trigger information including location information and media time information.

At step S223, the media time clocking unit 253 sets media time information included in the trigger information acquired in the process of step S222, and begins clocking of the time according to the media time information.

At step S224, the subtitle information acquiring unit 254 controls the communication unit 222 to access the subtitle server 30 over the Internet 90 in accordance with the location information included in the trigger information and request subtitle information. At step S225, the subtitle information acquiring unit 254 controls the communication unit 222 to acquire subtitle information delivered from the subtitle server 30, in response to the request to the subtitle server 30 in the process of step S224.

It should be noted that the subtitle information acquired by the subtitle information acquiring unit 254 is analyzed by the analysis unit 252. The subtitle information acquired here is configured of SIT information as hint information and a TTML document having a complete content.

At step S226, it is determined whether or not the time clocked by the media time clocking unit 253 is within the subtitle display time defined in the TTML document constituting the subtitle information. That is, in the body document instance of the TTML document, one or more p elements are listed, and in each p element, a character string of a subtitle and the display begin time and the display end time are designated. As such, it is determined whether or not there is a subtitle in which the clocked time of the media time is within the period from the display begin time to the display end time, for example.

At step S226, when it is determined that the clocked time of the media time is within the subtitle display time defined in the TTML document, the process proceeds to step S227. At step S227, the subtitle controller 255 controls the subtitle processing unit 221 to allow the target subtitle defined in the TTML document to be displayed. Thereby, as described in the use case 1 of FIG. 9, in the receiving device 20, a subtitle "Hello" is superimposed on a video P11 of the recorded program being played during the period from the time t1 to the time t2 of the clocked time of the media time, and a subtitle "Nice to meet you" is superimposed on a video P12 of the recorded program being played during the period from the time t3 to the time t4, for example.

Meanwhile, at step S226, when it is determined that the clocked time of the media time is out of the subtitle display time defined in the TTML document, the process of step S227 is skipped, and the process proceeds to step S228.

At step S228, the trigger information acquiring unit 251 determines whether or not trigger information embedded in the video data is acquired, on the basis of the monitoring result of the process of step S221. At step S228, when it is determined that trigger information is acquired, the process proceeds to step S229.

At step S229, the media time clocking unit 253 sets the media time information included in the trigger information acquired in the process of step S228 and updates the clocked time of the media time. Thereby, the clocked time of the media time is adjusted. Meanwhile, at step S228, when it is determined that trigger information is not acquired, the process of step S229 is skipped, and the process proceeds to step S230.

Figure 22:
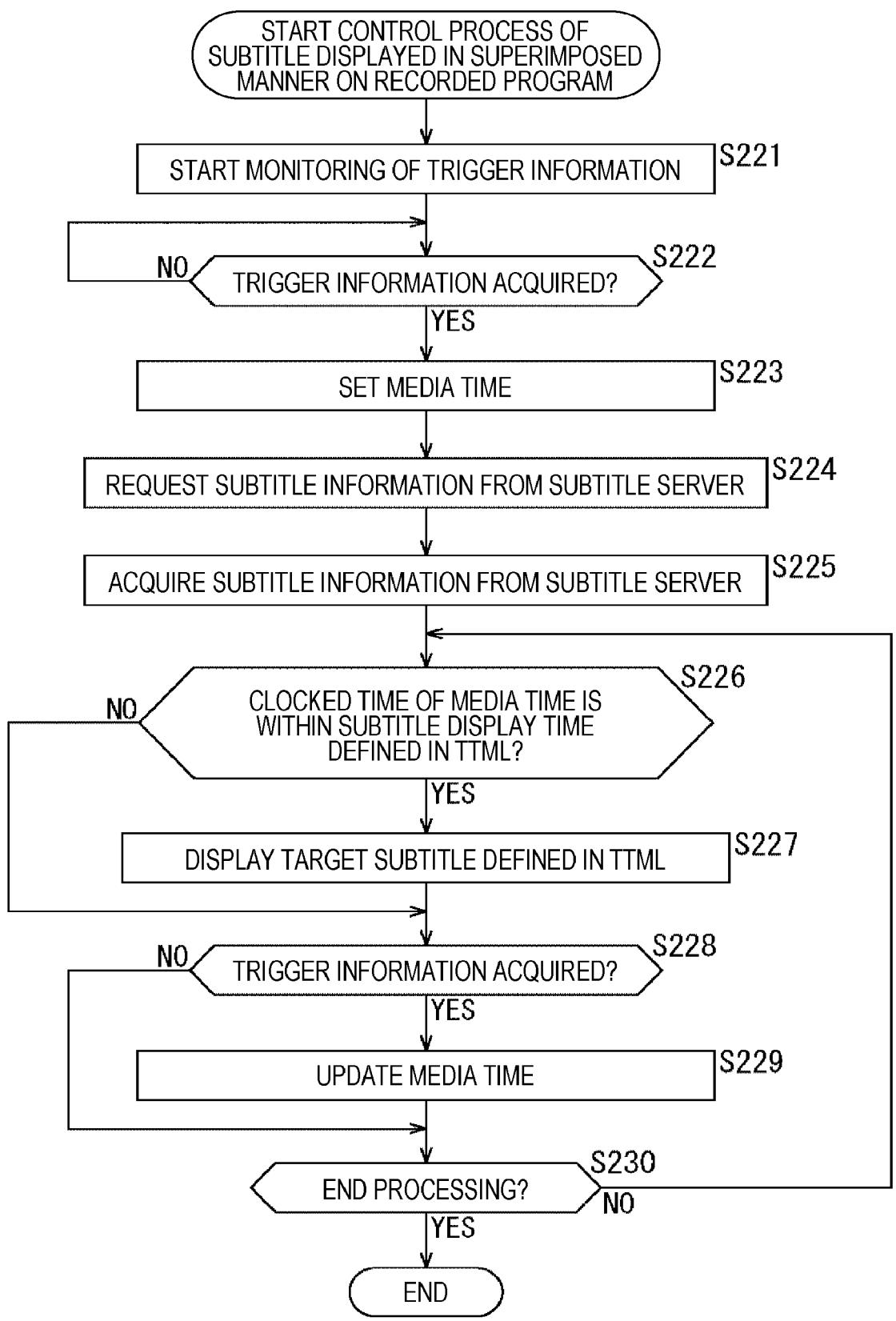
FIG. 22 is a flowchart explaining a flow of a control process of subtitles to be displayed in a superimposed manner on a recorded program.

At step S230, it is determined whether or not to end the subtitle control process of FIG. 22. At step S230, when it is determined not to end the subtitle control process, the process returns to step S226, and the processes at step S226 and subsequent steps are repeated. Then, at step S230, when it is determined to end the subtitle control process, the control process of subtitles displayed in a superimposed manner on the recorded program of FIG. 22 ends.

The flow of the control process of subtitles displayed in a superimposed manner on the recorded program has been described above. It should be noted that the control process of subtitles displayed in a superimposed manner on the recorded program corresponds to the aforementioned use case 1 (FIG. 9).

(Control Process of Subtitle Displayed in Superimposed Manner on Live Program)

Next, a flow of a control process of subtitles displayed in a superimposed manner on a live program executed by the receiving device 20 of FIG. 15 will be described with reference to the flowchart of FIG. 23. It should be noted that prior to the control process of subtitles displayed in a superimposed manner on a live program, it is assumed that in the receiving device 20, the digital broadcast signal receiving process of FIG. 21 has been performed and a live program such as sport broadcasting is being played as broadcast content, for example.

At steps S231 to S232, similarly to steps S221 to S222 in FIG. 22, trigger information is monitored by the trigger information acquiring unit 251, and when trigger information is acquired, the process proceeds to step S233. The trigger information acquired by the trigger information acquiring unit 251 is analyzed by the analysis unit 252. The trigger information acquired here is subtitle trigger information and includes location information.

At steps S233 to S234, similarly to steps S224 to S225 of FIG. 22, subtitle information delivered from the subtitle server 30 is acquired by the subtitle information acquiring unit 254. The subtitle information acquired by the subtitle information acquiring unit 254 is analyzed by the analysis unit 252. The subtitle information acquired here is configured of SIT information as hint information and a TTML document as a template.

At step S235, the trigger information acquiring unit 251 determines whether or not trigger information embedded in the video data is acquired, on the basis of the monitoring result of step S231. At step S235, when it is determined that trigger information is acquired, the process proceeds to step S236.

At step S236, the subtitle controller 255 controls the subtitle processing unit 221 to display the target subtitle defined in the trigger information acquired in the process of step S235. Thereby, as described in the use case 2 of FIG. 10, in the receiving device 20, a subtitle "Hello" is superimposed on a video 21 of the live program being played at the timing of acquiring the trigger information, and then a subtitle "Nice to meet you" is superimposed on a video 22 of the live program being played.

Meanwhile, at step S235, if it is determined that trigger information is not acquired, the process of step S236 is skipped, and the process proceeds to step S237.

Figure 23:
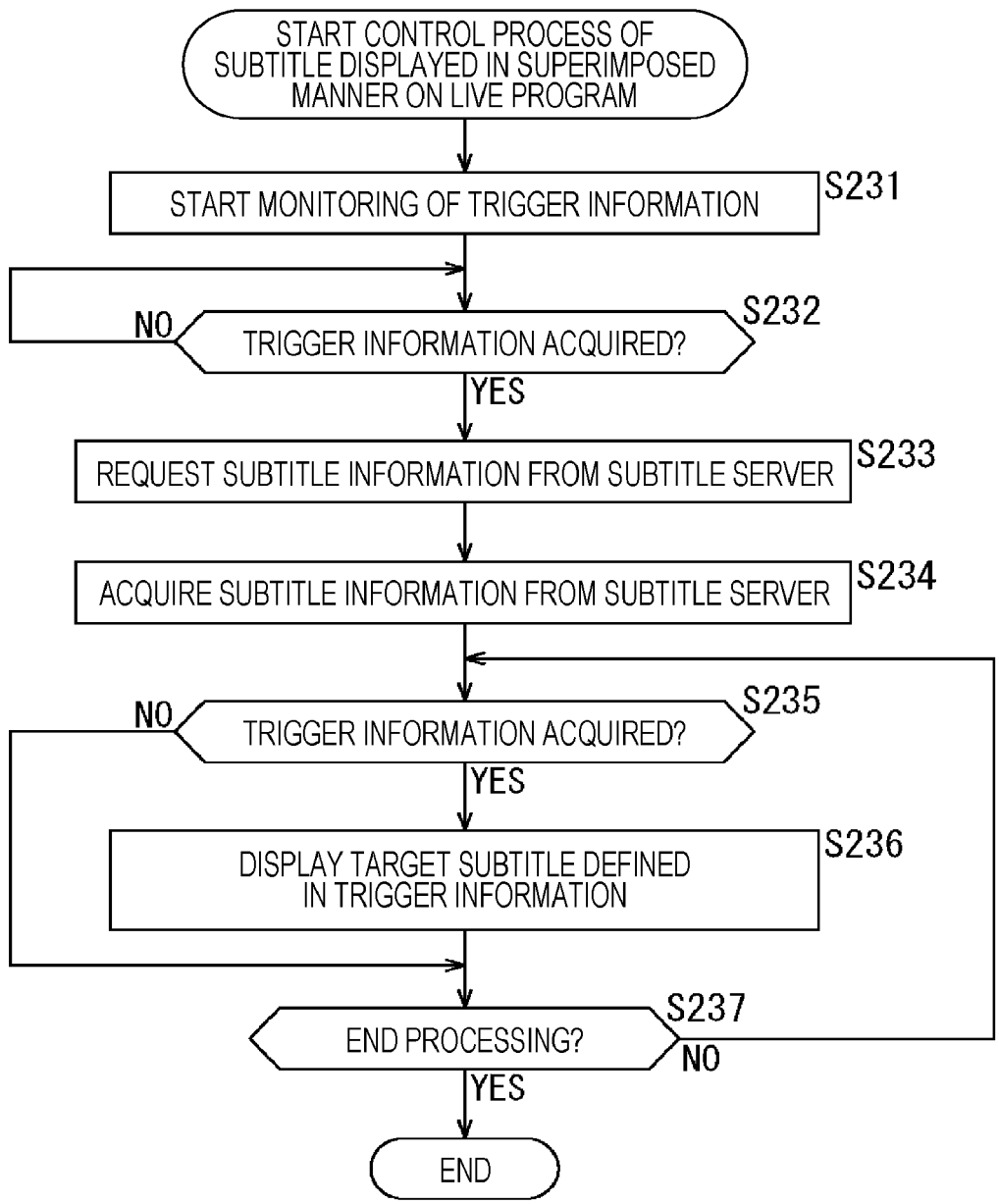
FIG. 23 is a flowchart explaining a flow of a control process of subtitles to be displayed in a superimposed manner on a live program.

At step S237, it is determined whether or not to end the subtitle control process of FIG. 23. At step S237, when it is determined not to end the subtitle control process, the process returns to step S235, and the processes at step S235 and subsequent steps are repeated. Then, at step S237, when it is determined to end the subtitle control process, the control process of subtitles displayed in a superimposed manner on the live program of FIG. 23 ends.

The flow of the control process of subtitles displayed in a superimposed manner on a live program has been described above. It should be noted that the control process of subtitles displayed in a superimposed manner on a live program corresponds to the use case 2 (FIG. 10) described above.

(Subtitle Control Process of Hybrid Type)

Next, a flow of a subtitle control process of hybrid type executed by the receiving device 20 of FIG. 15 will be described with reference to the flowchart of FIG. 24. It should be noted that prior to the subtitle control process of the hybrid type, it is assumed that the digital broadcast signal receiving process of FIG. 21 has been performed and the broadcast content is being played in the receiving device 20.

At steps S241 to S242, similarly to steps S221 to S222 of FIG. 22, trigger information is monitored by the trigger information acquiring unit 251, and when trigger information is acquired, the process proceeds to step S243. The trigger information acquired by the trigger information acquiring unit 251 is analyzed by the analysis unit 252. The trigger information acquired here is subtitle trigger information, and includes location information and media time information.

At step S243, similarly to step S223 of FIG. 22, media time information included in the trigger information acquired in the process of step S242 is set by the media time clocking unit 253.

At steps S244 to S245, similarly to steps S224 to S225 of FIG. 22, subtitle information delivered from the subtitle server 30 is acquired by the subtitle information acquiring unit 254. The subtitle information acquired by the subtitle information acquiring unit 254 is analyzed by the analysis unit 252. The subtitle information acquired here is configured of SIT information as hint information and a TTML document having a complete but provisional content.

At steps S246 to S247, similarly to steps S226 to S227 of FIG. 22, it is determined whether or not the time clocked by the media time clocking unit 253 is within the subtitle display time defined in the TTML document constituting the subtitle information. When the clocked time of the media time is within the subtitle display time, the target subtitle is displayed by the subtitle controller 255. Thereby, as described in the use case 3 of FIG. 11, in the receiving device 20, a subtitle "Hello" is superimposed on a video P31 of the TV program being played during the period from the time t1 to the time t2 of the clocked time of the media time.

At step S248, the trigger information acquiring unit 251 determines whether or not trigger information embedded in the video data is acquired, on the basis of the monitoring result of step S241. At step S248, when it is determined that trigger information is acquired, the process proceeds to step S249.

At step S249, the subtitle controller 255 controls the subtitle processing unit 221 to display the target subtitle according to the trigger information acquired in the process of step S248. Thereby, as described in the use case 3 of FIG. 11, a subtitle "Nice to meet you" is superimposed on a video P32 of the TV program being played at the timing of acquiring the trigger information, and then, a subtitle "Good-bye" is superimposed on a video P33 of the TV program being played, in the receiving device 20, for example.

Meanwhile, at step S248, if it is determined that trigger information is not acquired, the process of step S249 is skipped, and the process proceeds to step S250.

Figure 24:
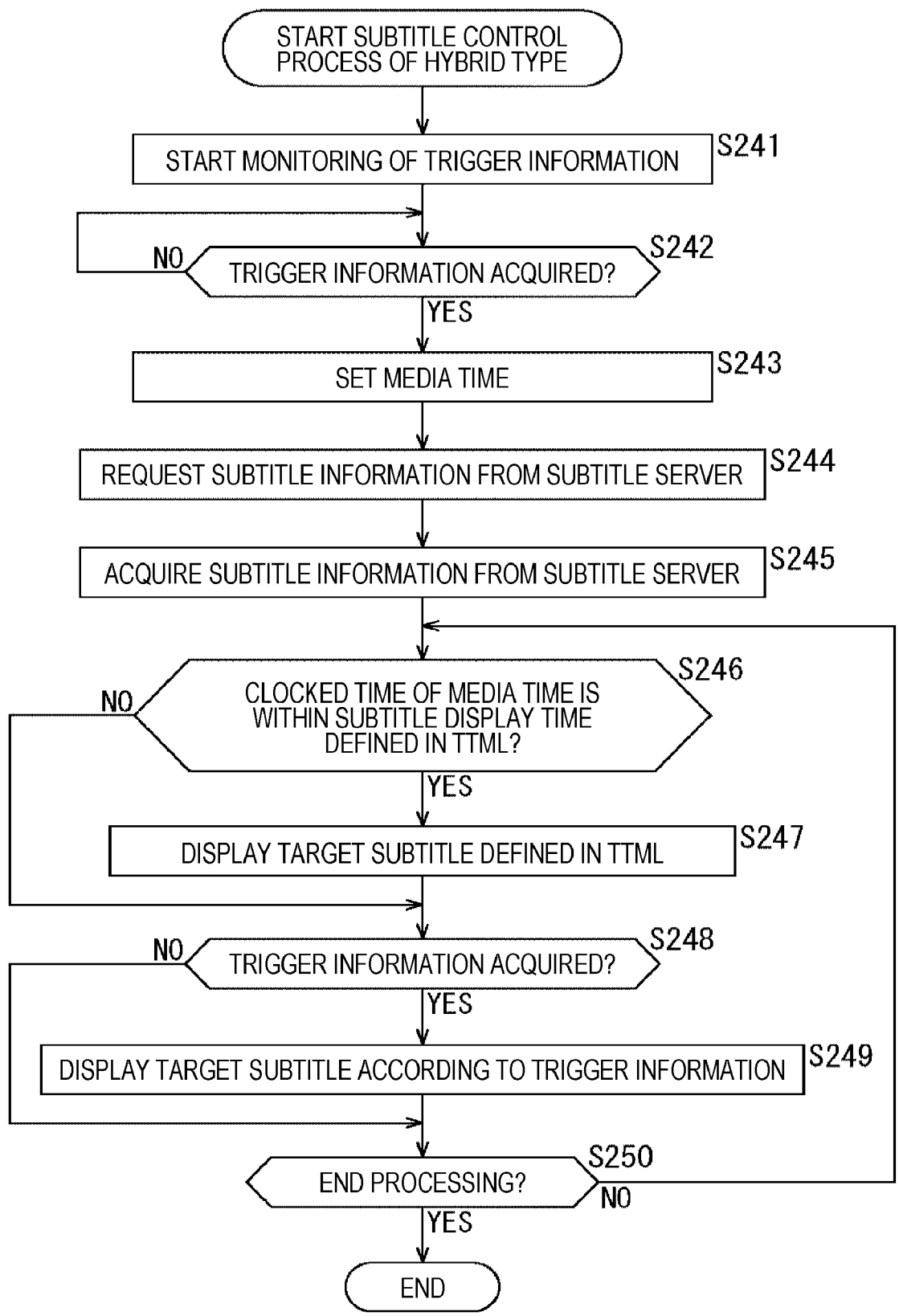
FIG. 24 is a flowchart explaining a flow of a control process of subtitles of a hybrid type.

At step S250, it is determined whether or not to end the subtitle control process of FIG. 24. At step S250, if it is determined not to end the subtitle control process, the process returns to step S246, and the processes at step S246 and subsequent steps are repeated. Then, at step S250, when it is determined to end the subtitle control process, the subtitle control process of hybrid type of FIG. 24 ends.

The flow of the subtitle control process of hybrid type has been described above. It should be noted that the subtitle control process of hybrid type corresponds to the use case 3 (FIG. 11) described above.

(Control Process of Subtitle Displayed in Superimposed Manner on Recorded Program in ACR Compliant Case)

Next, a flow of a control process of subtitles displayed in a superimposed manner on a recorded program in an ACR compatible case, executed by the receiving device 20 of FIG. 15, will be described with reference to the flowchart of FIG. 25. It should be noted that prior to the control process of subtitles displayed in a superimposed manner on a recorded program in an ACR compatible case, it is assumed that in the receiving device 20, the digital broadcast signal receiving process of FIG. 21 has been performed and a recorded program such as a drama is being played as broadcast content.

At step S251, the fingerprint information acquiring unit 256 determines whether or not it is the timing to acquire trigger information. At step S251, if it is determined it is not the timing to acquire trigger information, the determination process of step S251 is repeated. At step S251, it is waited until the timing to acquire trigger information in the cycle of several seconds, for example, and then the process proceeds to step S252.

At step S252, the fingerprint information acquiring unit 256 acquires (extracts) fingerprint information from video data output from the video decoder 219, controls the communication unit 222 to access the ACR server 40 over the Internet 90 to transmit the fingerprint information.

At step S253, the trigger information acquiring unit 251 controls the communication unit 222 and acquires trigger information transmitted from the ACR server 40 according to the process of step S252. It should be noted that the trigger information acquired by the trigger information acquiring unit 251 is analyzed by the analysis unit 252. The trigger information acquired here is subtitle trigger information including location information and media time information.

At step S254, similarly to step S223 of FIG. 22, the media time information included in the trigger information acquired in the process of step S253 is set by the media time clocking unit 253.

At steps S255 to S256, similarly to steps S224 to S225 of FIG. 22, subtitle information delivered from the subtitle server 30 is acquired by the subtitle information acquiring unit 254. The subtitle information acquired by the subtitle information acquiring unit 254 is analyzed by the analysis unit 252. The subtitle information acquired here is configured of SIT information as hint information and a TTML document having a complete content.

At steps S257 to S258, similarly to steps S226 to S227 of FIG. 22, it is determined whether or not the time clocked by the media time clocking unit 253 is within the subtitle display time defined in the TTML document constituting the subtitle information. When the clocked time of the media time is within the subtitle display time, the target subtitle is displayed by the subtitle controller 255. Thereby, as described in the user case 4 of FIG. 12, in the receiving device 20, a subtitle "Hello" is superimposed on a video P51 of the recorded program being played during the period from the time t1 to the time t2 of the clocked time of the media time, and a subtitle "Nice to meet you" is superimposed on a video P52 of the recorded program being played during the period from the time t3 to the time t4, for example.

At step S259, similarly to step S251 described above, it is determined by the fingerprint information acquiring unit 256 whether or not it is the timing to acquire trigger information. At step S259, if it is determined that it is the timing to acquire trigger information, the processing proceeds to step S260.

At steps S260 to S261, similarly to steps S252 to S253 described above, the fingerprint information acquired by the fingerprint information acquiring unit 256 is transmitted to the ACR server 40, whereby the trigger information delivered from the ACR server 40 is acquired by the trigger information acquiring unit 251. It should be noted that the trigger information acquired by the trigger information acquiring unit 251 is analyzed by the analysis unit 252. The trigger information acquired here is subtitle trigger information including location information and media time information.

At step S262, similarly to step S229 of FIG. 22, the media time information included in the trigger information acquired in the process of step S261 is set by the media time clocking unit 253, and the media time is updated.

Figure 25:
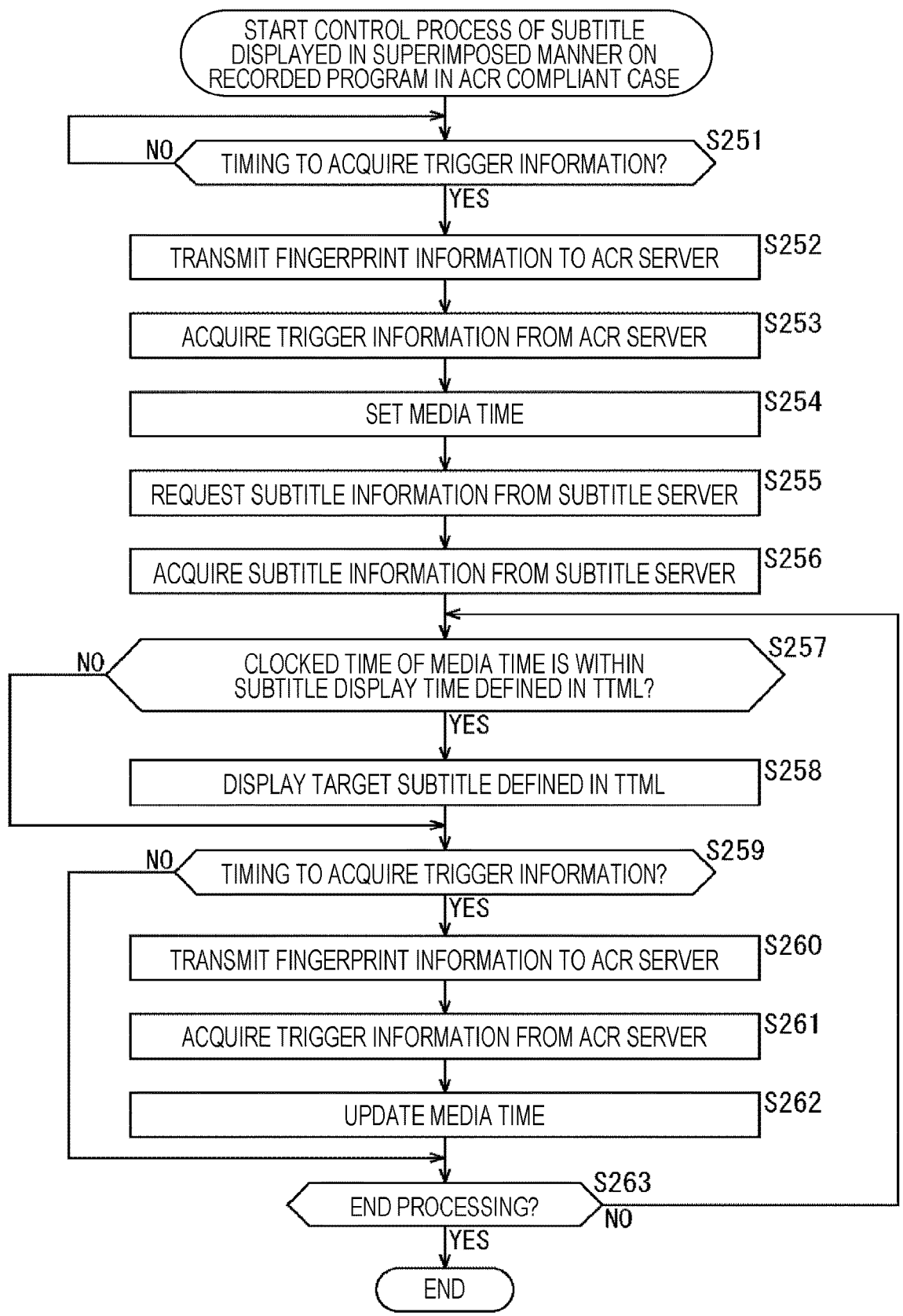
FIG. 25 is a flowchart explaining a flow of a control process of subtitles to be displayed in a superimposed manner on a recorded program in an ACR compliant case.

At step S263, it is determined whether or not to end the subtitle control process of FIG. 25. At step S263, if it is determined not to end the subtitle control process, the process returns to step S257 and repeats the process at step S257 and subsequent steps. Then, at step S263, when it is determined to end the subtitle control process, the control process of subtitles displayed in a superimposed manner on a recorded program in the ACR compatible case of FIG. 25 ends.

The control process of subtitles displayed in a superimposed manner on a recorded program in an ACR compatible case has been described above. It should be noted that the control process of subtitles displayed in a superimposed manner on a recorded program in then ACR compatible case corresponds to the use case 4 (FIG. 12) described above.

(Control Process of Subtitle Displayed in Superimposed Manner on Live Program in ACR Compliant Case)

Next, a flow of a control process of subtitles displayed in a superimposed manner on a live program in an ACR compliant case, executed by the receiving device 20 of FIG. 15, will be described with reference to the flowchart of FIG. 26. It should be noted that prior to the control process of subtitles displayed in a superimposed manner on a live program in an ACR compliant case, it is assumed that in the receiving device 20, the digital broadcast signal receiving process of FIG. 21 has been performed and a live program such as sport broadcasting is played as broadcast content.

At step S271, similarly to step S251 of FIG. 25, it is determined by the fingerprint information acquiring unit 256 whether or not it is the timing to acquire trigger information.

At step S271, if it is determined that it is the timing to acquire trigger information, the process proceeds to step S272.

At steps S272 to S273, similarly to steps S252 to S253 of FIG. 25, fingerprint information acquired by the fingerprint information acquiring unit 256 is transmitted to the ACR server 40, whereby trigger information delivered from the ACR server 40 is acquired by the trigger information acquiring unit 251. It should be noted that the trigger information acquired by the trigger information acquiring unit 251 is analyzed by the analysis unit 252. The trigger information acquired here is subtitle trigger information including location information.

At steps S274 to S275, similarly to steps S233 to S234 of FIG. 23, the subtitle information delivered from the subtitle server 30 is acquired by the subtitle information acquiring unit 254. The subtitle information acquired by the subtitle information acquiring unit 254 is analyzed by the analysis unit 252. The subtitle information acquired here is configured of SIT information as hint information and a TTML document as a template.

At step S276, similarly to step S251 of FIG. 25, it is determined by the fingerprint information acquiring unit 256 whether or not it is the timing to acquire trigger information. At step S276, if it is determined that it is the timing to acquire trigger information, the process proceeds to step S277.

At steps S277 to S278, similarly to steps S252 to S253 of FIG. 25, the fingerprint information acquired by the fingerprint information acquiring unit 256 is transmitted to the ACR server 40, whereby the trigger information delivered from the ACR server 40 is acquired by the trigger information acquiring unit 251. It should be noted that the trigger information acquired by the trigger information acquiring unit 251 is analyzed by the analysis unit 252. The trigger information acquired here is subtitle trigger information including location information.

At step S279, similarly to step S236 of FIG. 23, the target subtitle defined in the trigger information acquired in the step S278 is displayed by the subtitle controller 255. Thereby, as described in the use case 5 of FIG. 13, in the receiving device 20, a subtitle "Hello" is superimposed on a video 61 of the live program being played at the timing of acquiring the trigger information, and then a subtitle "Nice to meet you" is superimposed on a video 62 of the live program being played.

Figure 26:
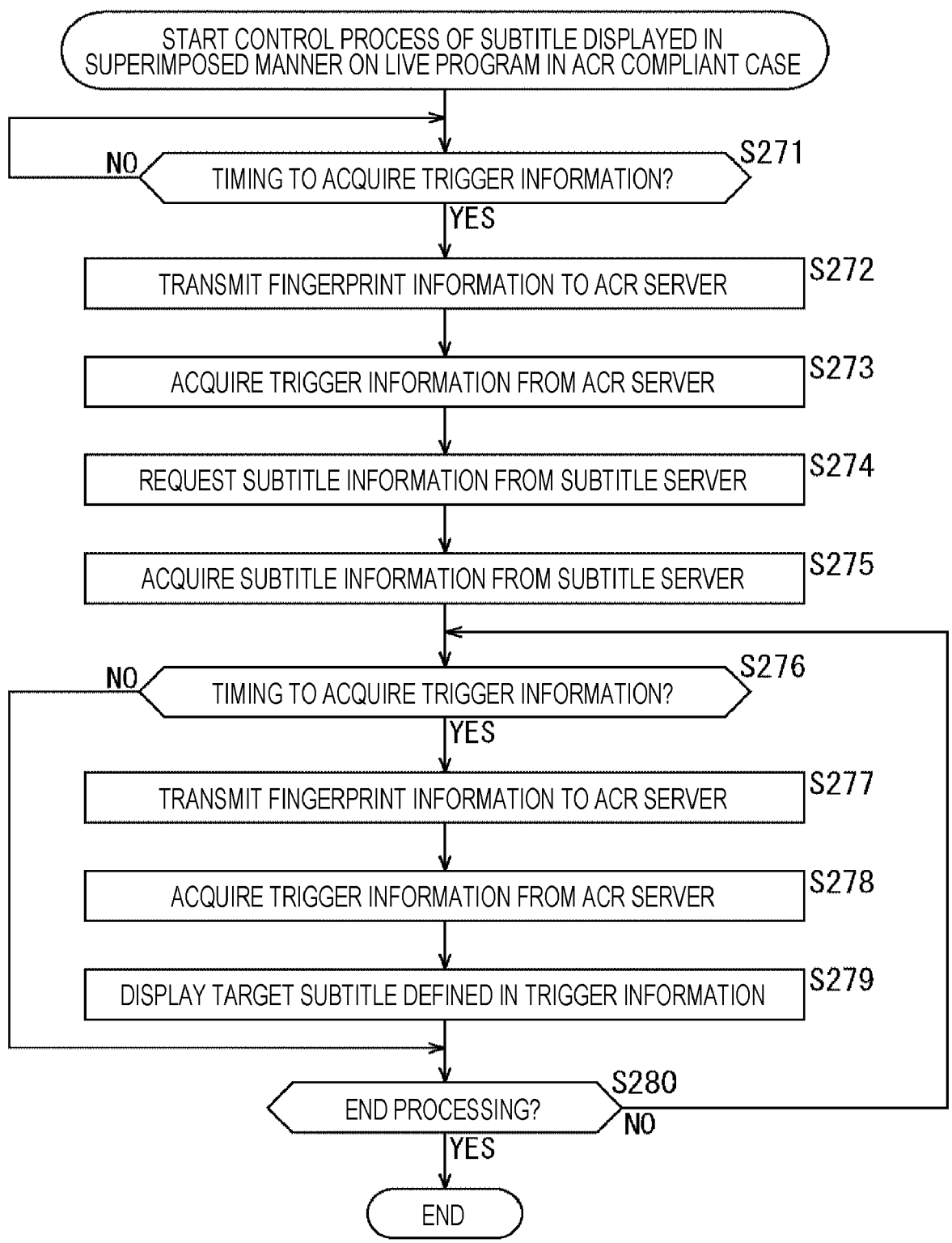
FIG. 26 is a flowchart explaining a flow of a control process of subtitles to be displayed in a superimposed manner on a live program in an ACR compliant case.

At step S280, it is determined whether or not to end the subtitle control process of FIG. 26. At step S280, if it is determined not to end the subtitle control process, the process returns to step S276, and the processes at step S276 and subsequent steps are repeated. Then, at step S280, if it is determined to end the subtitle control process, the control process of subtitles displayed in a superimposed manner on the live program in the ACR compliant case of FIG. 26 ends.

The control process of subtitles displayed in a superimposed manner on a live program in an ACR compliant case has been described above. It should be noted that the control process of subtitles displayed in a superimposed manner on a live program in the ACR compliant case corresponds to the use case 5 (FIG. 13) described above.

(Subtitle Control Process of Hybrid Type in ACR Compliant Case)

Next, a flow of a subtitle control process of hybrid type in an ACR compliant case, executed by the receiving device 20 of FIG. 15, will be described with reference to the flowchart of FIG. 27. It should be noted that prior to the subtitle control process of the hybrid type in an ACR compliant case, it is assumed that in the receiving device 20, the digital broadcast signal receiving process of FIG. 21 has been performed and the broadcast content is being played.

At step S281, similarly to step S251 of FIG. 25, it is determined by the fingerprint information acquiring unit 256 whether or not it is the timing to acquire trigger information. At step S281, if it is determined that it is the timing to acquire trigger information, the process proceeds to step S282.

At steps S282 to S283, similarly to steps S252 to S253 of FIG. 25, fingerprint information acquired by the fingerprint information acquiring unit 256 is transmitted to the ACR server 40, whereby trigger information delivered from the ACR server 40 is acquired by the trigger information acquiring unit 251. It should be noted that the trigger information acquired by the trigger information acquiring unit 251 is analyzed by the analysis unit 252. The trigger information acquired here is subtitle trigger information, and includes location information and media time information.

At step S284, similarly to step S243 of FIG. 24, media time information included in the trigger information acquired in the process of step S283 is set by the media time clocking unit 253.

At steps S285 to S286, similarly to steps S244 to S245 of FIG. 24, subtitle information delivered from the subtitle server 30 is acquired by the subtitle information acquiring unit 254. The subtitle information acquired by the subtitle information acquiring unit 254 is analyzed by the analysis unit 252. The subtitle information acquired here is configured of SIT information as hint information and a TTML document having a complete but provisional content.

At steps S287 to S288, similarly to steps S246 to S247 of FIG. 24, it is determined whether or not the time clocked by the media time clocking unit 253 is within the subtitle display time defined in the TTML document constituting the subtitle information. When the clocked time of the media time is within the subtitle display time, the target subtitle is displayed by the subtitle controller 255. Thereby, as described in the use case 6 of FIG. 14, in the receiving device 20, a subtitle "Hello" is superimposed on a video P71 of the TV program being played during the period from the time t1 to the time t2 of the clocked time of the media time.

At step S289, similarly to step S251 of FIG. 25, it is determined by the fingerprint information acquiring unit 256 whether or not it is the timing to acquire trigger information. At step S289, if it is determined that it is the timing to acquire trigger information, the process proceeds to step S290.

At steps S290 to S291, similarly to steps S252 to S253 of FIG. 25, the fingerprint information acquired by the fingerprint information acquiring unit 256 is transmitted to the ACR server 40, whereby the trigger information delivered from the ACR server 40 is acquired by the trigger information acquiring unit 251. It should be noted that the trigger information acquired by the trigger information acquiring unit 251 is analyzed by the analysis unit 252. The trigger information acquired here is subtitle trigger information including location information.

At step S292, similarly to step S249 of FIG. 24, the target subtitle is displayed by the subtitle controller 255 according to the trigger information acquired in the process of step S291. Thereby, as described in the use case 6 of FIG. 14, a subtitle "Nice to meet you" is superimposed on a video P72 of the TV program being played at the timing of acquiring the trigger information, and then, a subtitle "Good-bye" is superimposed on a video P73 of the TV program being played, in the receiving device 20, for example.

Figure 27:
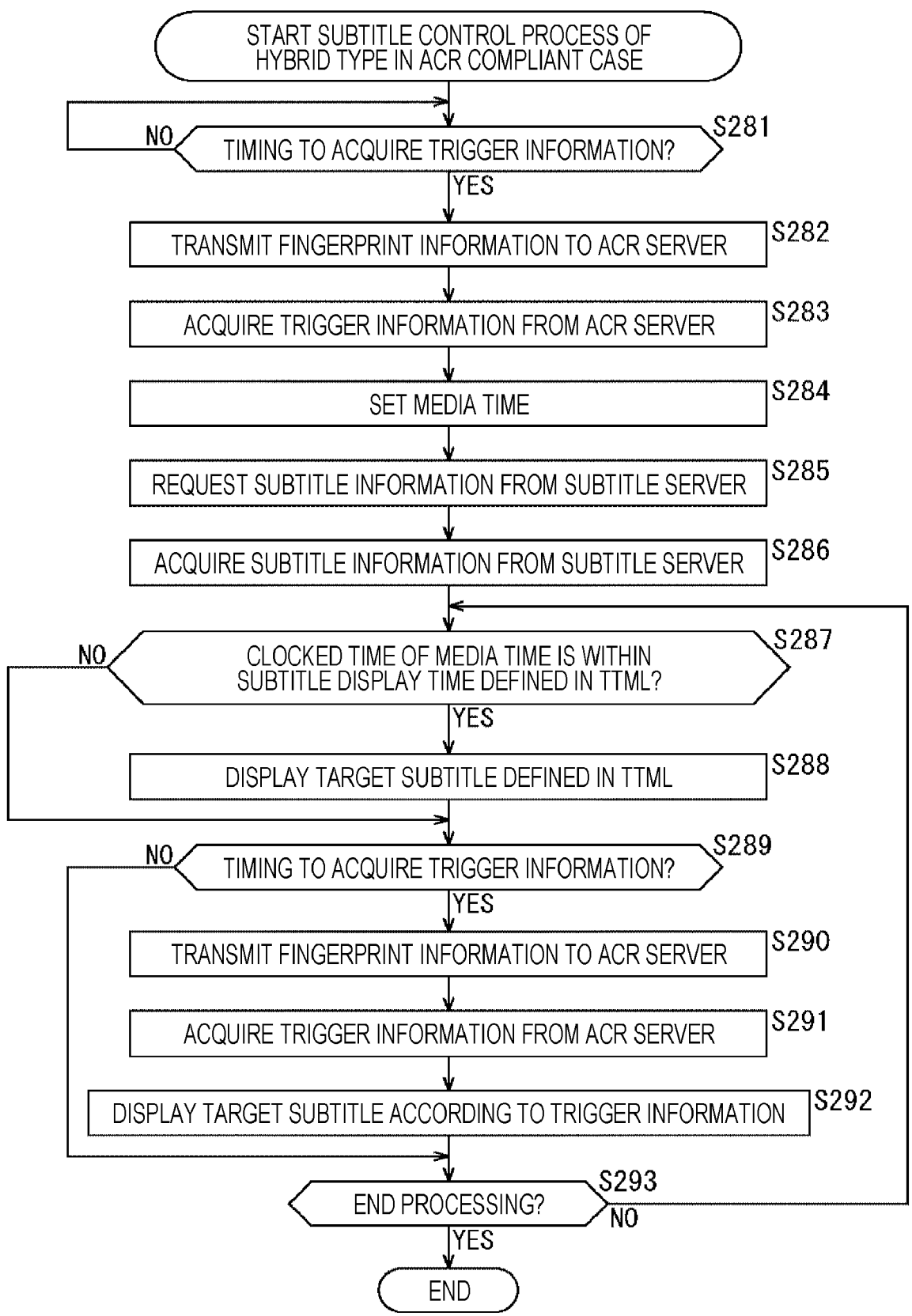
FIG. 27 is a flowchart explaining a flow of a control process of subtitles of hybrid type in an ACR compliant case.

At step S293, it is determined whether or not to end the subtitle control process of FIG. 27. At step S293, if it is determined not to end the subtitle control process, the process returns to step S287, and the processes at step S287 and subsequent steps are repeated. Then, at step S293, if it is determined to end the subtitle control process, the subtitle control process of hybrid type in the ACR compliant case of FIG. 27 ends.

The subtitle control process of hybrid type in an ACR compliant case has been described above. It should be noted that the subtitle control process of hybrid type in an ACR compliant case corresponds to the use case 6 (FIG. 14) described above.

(Subtitle Information Delivery Process)

Figure 28:
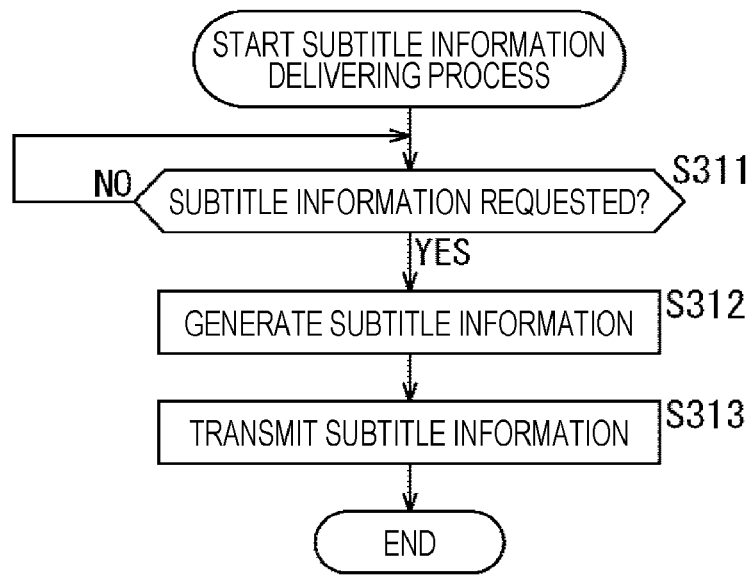
FIG. 28 is a flowchart explaining a subtitle information distributing process.

Next, a flow of a subtitle information delivery process executed by the subtitle server 30 of FIG. 15 will be described with reference to the flowchart of FIG. 28.

At step S311, the controller 311 regularly monitors the communication state of the communication unit 314, and determines whether or not subtitle information is requested from the receiving device 20. In the determination process of step S311, it is waited until subtitle information is supplied from the receiving device 20, and then the process proceeds to step S312.

At step S312, the subtitle information processing unit 313 generates subtitle information corresponding to the request from the receiving device 20 on the basis of the SIT information and the TTML document held by the subtitle information holding unit 312, in accordance with control from the controller 311. Further, at step S313, the communication unit 314 transmits the subtitle information generated in the process of step S312 to the receiving device 20 that is the requestor of the subtitle information, in accordance with control from the controller 311, over the Internet 90. When the process of step S313 ends, the subtitle information delivery process of FIG. 28 ends.

The flow of subtitle information delivery process has been described above.

(Trigger Information Delivery Process)

Figure 29:
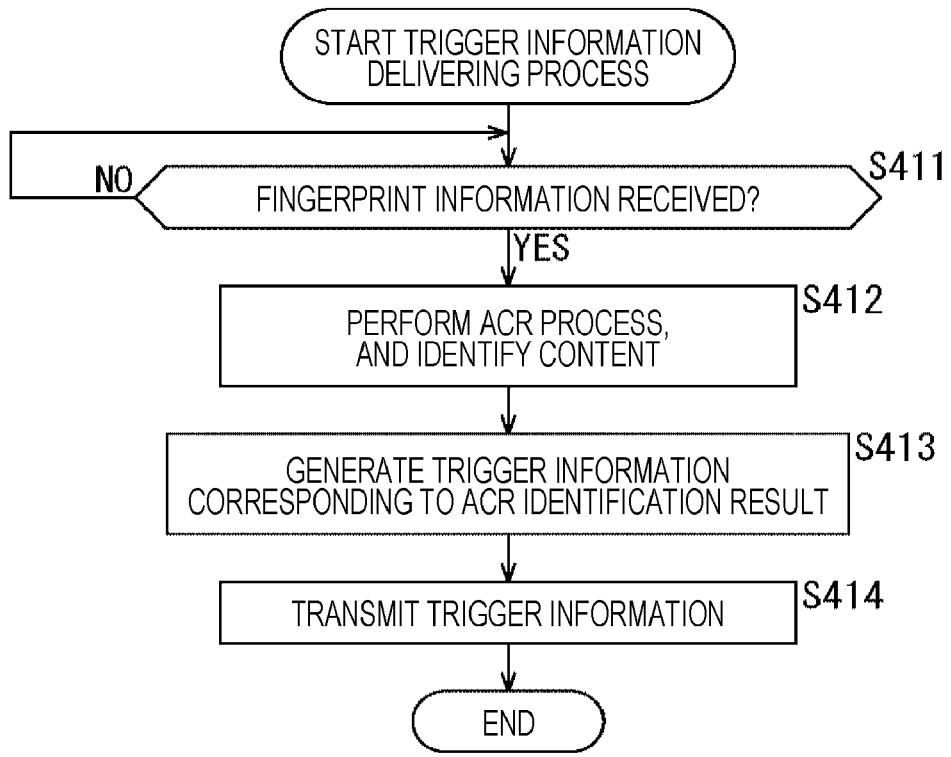
FIG. 29 is a flowchart explaining a trigger information distributing process.

Next, a flow of trigger information delivery process executed by the ACR server 40 of FIG. 15 will be descried with reference to the flowchart of FIG. 29.

At step S411, in response to an inquiry about trigger information from the receiving device 20, it is determined whether or not fingerprint information is received. At step S411, when it is determined that fingerprint information is not received, the determination process of step S411 is repeated. This means that at step S411, it is waited until fingerprint information is received by the communication unit 411, and then the process proceeds to step S412.

At step S412, the ACR identification processing unit 412 performs matching between the fingerprint information, received in the process of step S411, and the FP database 413 prepared in advance, and performs ACR identification process to identify the broadcast content being played in the receiving device 20.

At step S413, the trigger information generating unit 414 generates trigger information (subtitle trigger information of FIG. 1) for providing a function relating to subtitles, on the basis of the result of ACR identification process obtained in the process of step S412 and various types of information registered in the database 415 for trigger information.

At step S414, the communication unit 411 transmits the trigger information generated in the process of step S413 to the receiving device 20 that is the inquirer of the trigger information, over the Internet 90. When the process of step S414 ends, the trigger information delivery process of FIG. 29 ends.

The flow of trigger information delivery process has been described above.

It should be noted that in the above description, while "D" that is an abbreviation of "description" is used as the name of signaling information, "T" that is an abbreviation of "table" may also be used. For example, emergency alerting description (EAD) may also be described as emergency alerting table (EAT). Further, region rating description (RRD) may be described as region rating table (RRT), for example. However, the difference between them is a formal difference between "description" and "table", and the substantial contents of the respective pieces of signaling information are not different.

<6. Computer Configuration>

Figure 30:
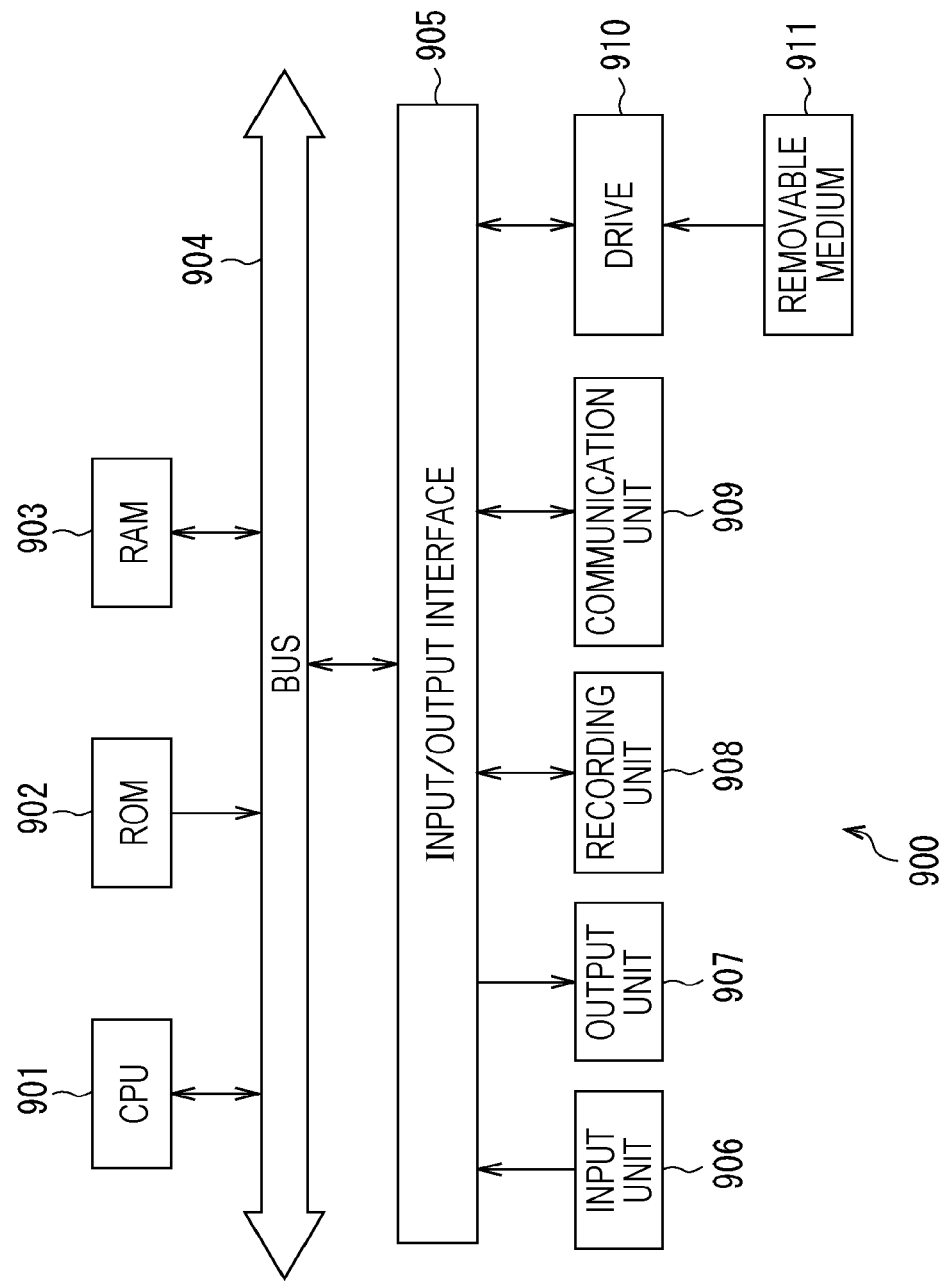
FIG. 30 is a diagram illustrating an exemplary configuration of a computer.

The aforementioned series of processes can be executed by hardware or executed by software. In the case of executing the series of processes by software, a program constituting the software is installed on a computer. FIG. 30 is a diagram illustrating an exemplary configuration of hardware of a computer that executes the aforementioned series of processes.

In a computer 900, a central processing unit (CPU) 901, a read only memory (ROM) 902, and a random access memory (RAM) 903 are connected with each other by a bus 904. To the bus 904, an input/output interface 905 is further connected. To the input/output interface 905, an input unit 906, an output unit 907, a recording unit 908, a communication unit 909, and a drive 910 are connected.

The input unit 906 is configured of a keyboard, a mouse, a microphone, and the like. The output unit 907 is configured of a display, a speaker, and the like. The recording unit 908 is configured of a hard disk, a nonvolatile memory, and the like. The communication unit 909 is configured of a network interface and the like. The drive 910 drives a removable medium 911 such as a magnetic disk, an optical disk, a magneto-optical disk, or a semiconductor memory.

In the computer 900 configured as described above, the CPU 901 loads a program stored in the ROM 902 or the recording unit 908 to the RAM 903 via the input/output interface 905 and the bus 904 and executes it to thereby the aforementioned series of processes is performed.

A program executed by the computer 900 (CPU 901) may be provided by being recorded on the removable medium 911 as a package medium or the like. Further, the program can be provided via a wired or wireless transmission medium such as a local area network, the Internet, or digital satellite broadcasting.

In the computer 900, it is possible to install a program on the recording unit 908 via the input/output interface 905 by loading the removable medium 911 to the drive 910. Further, a program can be received by the communication unit 909 via a wired or wireless transmission medium and installed on the recording unit 908. Besides, a program can be installed in advance on the ROM 902 or the recording unit 908.

It should be noted that in the present description, processes executed by a computer according to a program may not be necessarily performed in a time series along with the sequence described as a flowchart. This means that processes executed by a computer according to a program include processes executed in parallel or executed independently (parallel processing or processing by an object, for example). Further, a program may be processed by one computer (processor) or processed distributively by a plurality of computers.

It should be noted that embodiments of the present technology are not limited to the embodiments described above. Various changes can be made within a range not deviating from the scope of the present technology.

Further, the present technology may take the configurations described below.

(1)

A receiving device including:

a first acquiring unit that acquires trigger information for providing a function relating to a subtitle, the trigger information including location information by which a resource on the Internet is identifiable;

a second acquiring unit that acquires subtitle information including a document relating to a subtitle described in a predetermined computer language, on the basis of the location information included in the trigger information; and a subtitle controller that controls displaying of the subtitle on the basis of at least one of the trigger information and the subtitle information.

(2)

The receiving device according to (1), wherein the trigger information includes additional information for adding information relating to displaying of the subtitle to the document relating to the subtitle.

(3)

The receiving device according to (1) or (2), wherein the trigger information includes event information for operating information that relates to displaying of the subtitle and is described in the document relating to the subtitle.

(4)

The receiving device according to any of (1) to (3), wherein the trigger information includes time information for controlling displaying of the subtitle.

(5)

The receiving device according to any of (1) to (4), wherein the subtitle information further includes hint information relating to the subtitle.

(6)

The receiving device according to any of (1) to (5), wherein the document relating to the subtitle is described in Timed Text Markup Language (TTML).

(7)

The receiving device according to any of (1) to (6), wherein the trigger information is delivered by being included in a broadcast wave of digital broadcasting using an Internet Protocol (IP) transmission system, or is delivered from a server having a content recognition function provided on the Internet.

(8)

A receiving method of a receiving device, the method including the steps of, by the receiving device:

acquiring trigger information for providing a function relating to a subtitle, the trigger information including location information by which a resource on the Internet is identifiable;

acquiring subtitle information including a document relating to a subtitle described in a predetermined computer language, on the basis of the location information included in the trigger information; and controlling displaying of the subtitle on the basis of at least one of the trigger information and the subtitle information.

(9)

A transmitting device including:

a generating unit that generates trigger information for providing a function relating to a subtitle, the trigger information including location information for acquiring subtitle information including a document relating to a subtitle described in a predetermined computer language, and a transmitting unit that transmits the generated trigger information.

(10)

The transmitting device according to (9), wherein the trigger information includes additional information for adding information relating to displaying of the subtitle to the document relating to the subtitle.

(11)

The transmitting device according to (9) or (10), wherein the trigger information includes event information for operating information that relates to displaying of the subtitle and is described in the document relating to the subtitle.

(12)

The transmitting device according to any of (9) to (11), wherein the trigger information includes time information for controlling displaying of the subtitle.

(13)

The transmitting device according to any of (9) to (12), wherein the subtitle information further includes hint information relating to the subtitle.

(14)

The transmitting device according to any of (9) to (13), wherein the document relating to the subtitle is described in TTML.

(15)

The transmitting device according to any of (9) to (14), wherein the transmitting unit transmits the trigger information by including the trigger information in a broadcast wave of digital broadcasting using an IP transmission system.

(16)

A transmitting method of a transmitting device, the method including the steps of, by the transmitting device:

generating trigger information for providing a function relating to a subtitle, the trigger information including location information for acquiring subtitle information including a document relating to a subtitle described in a predetermined computer language, and transmitting the generated trigger information.

REFERENCE SIGNS LIST

1 Broadcast communication system
10 Transmitting device
20 Receiving device
30 Subtitle server
40 ACR server
90 Internet
117 Trigger information generating unit
121 Transmitting unit
212 Tuner
214 Controller
221 Subtitle processing unit
222 Communication unit 251 Trigger information acquiring unit
252 Analysis unit
253 Media time clocking unit
254 Subtitle information acquiring unit
255 Subtitle controller
256 Fingerprint information acquiring unit
311 Controller
313 Subtitle information processing unit
314 Communication unit
411 Communication unit
414 Trigger information generating unit
900 Computer
901 CPU

The invention claimed is:

1. A receiving device comprising:
receiver circuitry configured to receive an audio/video content stream; and
processing circuitry configured to
decode audio/video content included in the audio/video content stream for display to a user,
extract fingerprint information or watermark information from the audio/video content included in the audio/video content stream,
acquire, from a server via broadband communication, a single data structure including location information of a component associated with the audio/video content stream and time information indicating a reference time for performing display control of the component, the location information and the time information being acquired based on the fingerprint information or the watermark information,
acquire component information, including the component associated with the audio/video content stream, from a location indicated by the location information in the single data structure including the reference time for performing the display control of the component, and
control displaying of the component according to the time information in the single data structure including the location information from which the component was acquired.

2. The receiving device according to claim 1, wherein the component information includes language information relating to a language of the component.

3. The receiving device according to claim 2, wherein the component is text information which is to be displayed on a display.

4. The receiving device according to claim 1, wherein the processing circuitry is further configured to
acquire event information for operating information that relates to the displaying of the component, and
use the event information with the time information for controlling the displaying of the component.

5. The receiving device according to claim 3, wherein the text information is displayed with the audio/video content on the display.

6. The receiving device according to claim 3, wherein the component information includes a document described in Timed Text Markup Language (TTML).

7. The receiving device according to claim 1, wherein the server applies a content recognition function to the fingerprint information or the watermark information and provides the single data structure including the location information and the time information based on results of the content recognition function.

8. The receiving device according to claim 1, wherein the processing circuitry is configured to transmit the extracted fingerprint information or watermark information to the server and, in response to the transmitted fingerprint information or watermark information, receives from the server the single data structure including the location information and the time information associated with the audio/video content.

9. A receiving method of a receiving device, the method comprising the steps of, by the receiving device:
receiving, by receiver circuitry of the receiving device, an audio/video content stream;
decoding audio/video content included in the audio/video content stream for display to a user;
extracting fingerprint information or watermark information from the audio/video content included in the audio/video content stream,
acquiring, from a server via broadband communication, a single data structure including location information of a component associated with the audio/video content stream and time information indicating a reference time for performing display control of the component, the location information and the time information being acquired based on the fingerprint information or the watermark information;
acquiring component information, including the component associated with the audio/video content stream, from a location indicated by the location information in the single data structure including the reference time for performing the display control of the component; and
controlling displaying of the component according to the time information in the single data structure including the location information from which the component was acquired.

10. A transmitting device comprising:
processing circuitry configured to transmit an audio/video content stream including fingerprint information or watermark information, wherein
the fingerprint information or the watermark information is extracted from an audio/video content, included in the audio/video content stream, in a receiving device,
a single data structure including location information of a component associated with the audio/video content stream and time information indicating a reference time for performing display control of the component are acquired from a server via broadband communication, by the receiving device, the location information and the time information being acquired based on the fingerprint information or the watermark information,
component information, including the component associated with the audio/video content stream, is acquired, by the receiving device, from a location indicated by the location information in the single data structure including the reference time for performing the display control of the component, and
displaying of the component is controlled, in the receiving device, according to the time information in the single data structure including the location information from which the component was acquired.

11. The transmitting device according to claim 10, wherein the component information includes language information relating to a language of the component.

12. The transmitting device according to claim 11, wherein the component is text information which is to be displayed on a display of the receiving device.

13. The transmitting device according to claim 10, wherein
event information for operating information that relates to the displaying of the component is acquired by the receiving device, and
the event information is used with the time information for controlling the displaying of the component by the receiving device.

14. The transmitting device according to claim 12, wherein the text information is displayed with the audio/video content on the display.

15. The transmitting device according to claim 12, wherein the component information includes a document described in Timed Text Markup Language (TTML).

16. The transmitting device according to claim 10, wherein the server applies a content recognition function to the fingerprint information or the watermark information and provides the single data structure including the location information and the time information based on results of the content recognition function.

17. A transmitting method of a transmitting device, the method comprising:
transmitting, by processing circuitry of the transmitting device, an audio/video content stream including fingerprint information or watermark information, wherein
the fingerprint information or the watermark information is extracted from an audio/video content, included in the audio/video content stream, in a receiving device,
a single data structure including location information of a component associated with the audio/video content stream and time information indicating a reference time for performing display control of the component are acquired from a server via broadband communication, by the receiving device, the location information and the time information being acquired based on the fingerprint information or the watermark information,
component information, including the component associated with the audio/video content stream, is acquired, by the receiving device, from a location indicated by the location information in the single data structure including the reference time for performing the display control of the component, and
displaying of the component is controlled, in the receiving device, according to the time information in the single data structure including the location information from which the component was acquired.

* * * * *